United States Patent
Wu et al.

(10) Patent No.: US 7,407,539 B2
(45) Date of Patent: *Aug. 5, 2008

(54) PHASE CHANGE INKS

(75) Inventors: Bo Wu, Wilsonville, OR (US); Stephan V. Drappel, Toronto (CA); Trevor J. Snyder, Newberg, OR (US); Donald R. Titterington, Newberg, OR (US); Jule W. Thomas, Jr., West Linn, OR (US); C Geoffrey Allen, Waterdown (CA); Harold R. Frame, Gaston, OR (US); Wolfgang G. Wedler, Tualatin, OR (US)

(73) Assignee: Xerox Corporation, Norwalk, CT (US)

( * ) Notice: Subject to any disclaimer, the term of this patent is extended or adjusted under 35 U.S.C. 154(b) by 287 days.

This patent is subject to a terminal disclaimer.

(21) Appl. No.: 11/290,221

(22) Filed: Nov. 30, 2005

(65) Prior Publication Data

US 2007/0120911 A1    May 31, 2007

(51) Int. Cl.
    *C09D 11/00* (2006.01)
(52) U.S. Cl. .................... 106/31.29; 106/31.61
(58) Field of Classification Search ............. 106/31.29, 106/31.61
    See application file for complete search history.

(56) References Cited

U.S. PATENT DOCUMENTS

| | | | |
|---|---|---|---|
| 3,653,932 | A | 4/1972 | Berry et al. |
| 4,390,369 | A | 6/1983 | Merritt et al. |
| 4,484,948 | A | 11/1984 | Merritt et al. |
| 4,684,956 | A | 8/1987 | Ball |
| 4,851,045 | A | 7/1989 | Taniguchi |
| 4,889,560 | A | 12/1989 | Jaeger et al. |
| 4,889,761 | A | 12/1989 | Titterington et al. |
| 5,006,170 | A | 4/1991 | Schwarz et al. |
| 5,151,120 | A | 9/1992 | You et al. |
| 5,372,852 | A | 12/1994 | Titterington et al. |
| 5,496,879 | A | 3/1996 | Griebel et al. |
| 5,621,022 | A | 4/1997 | Jaeger et al. |
| 6,001,904 | A | 12/1999 | Matzinger et al. |
| 6,860,930 | B2 | 3/2005 | Wu et al. |
| 2005/0130054 | A1 | 6/2005 | Yuan et al. |

FOREIGN PATENT DOCUMENTS

| EP | 0 206 286 B1 | 5/1990 |
|---|---|---|
| EP | 0 187 352 B1 | 6/1991 |
| WO | WO 94/04619 | 3/1994 |

OTHER PUBLICATIONS

Copending U.S. Appl. No. 11/197,600, filed Aug. 4, 2005, entitled "Processes for Preparing Phase Change Inks", with the named inventors Frank P. Lee, Raymond W. Wong, and Sheau Van Kao.
Copending U.S. Appl. No. 11/126,745, filed May 11, 2005, entitled "Method of Purification of Polyalkylene Materials," by San-Ming Yang et al.
Copending U.S. Appl. No. 11/291,055, filed Nov. 30, 2005, entitled "Phase Change Inks," by Bo Wu et al.
Copending U.S. Appl. No. 11/290,263, filed Nov. 30, 2005, entitled "Phase Change Inks," by Bo Wu et al.
Copending U.S. Appl. No. 11/291,056, filed Nov. 30, 2005, entitled "Colorant Compounds," by Jeffery H. Banning et al.
Copending U.S. Appl. No. 11/291,057, filed Nov. 30, 2005, entitled "Phase Change Inks," by Jeffery H. Banning et al.
Copending U.S. Appl. No. 11/290,258, filed Nov. 30, 2005, entitled "Phase Change Inks Containing Specific Colorants," by Bo Wu et al.
Copending U.S. Appl. No. 11/290,265, filed Nov. 30, 2005, entitled "Phase Change Inks," by Trevor J. Snyder et al.
Copending U.S. Appl. No. 11/290,222, filed Nov. 30, 2005, entitled "Phase Change Inks Containing Fischer-Tropsch Waxes," by Bo Wu et al.
English abstract for German Patent Publication DE 4205636AL.
English abstract for German Patent Publication DE 4205713AL.

*Primary Examiner*—J. A. Lorengo
*Assistant Examiner*—Veronica Faison-Gee
(74) *Attorney, Agent, or Firm*—Judith L. Byorick

(57) ABSTRACT

Disclosed is a phase change ink comprising (a) a colorant and (b) a phase change ink carrier, said carrier comprising (i) a branched triamide and (ii) a polyethylene wax having an average peak molecular weight of from about 350 to about 730, a polydispersity of from about 1.03 to about 3.0, and an asymmetrical molecular weight distribution skewed toward the high molecular weight end. Also disclosed is a process which comprises (1) incorporating into an ink jet printing apparatus a phase change ink comprising (a) a colorant and (b) a phase change ink carrier, said carrier comprising (i) a branched triamide and (ii) a polyethylene wax having an average peak molecular weight of from about 350 to about 730, a polydispersity of from about 1.03 to about 3.0, and an asymmetrical molecular weight distribution skewed toward the high molecular weight end; (2) melting the ink; and (3) causing droplets of the melted ink to be ejected in an imagewise pattern onto a substrate.

71 Claims, 1 Drawing Sheet

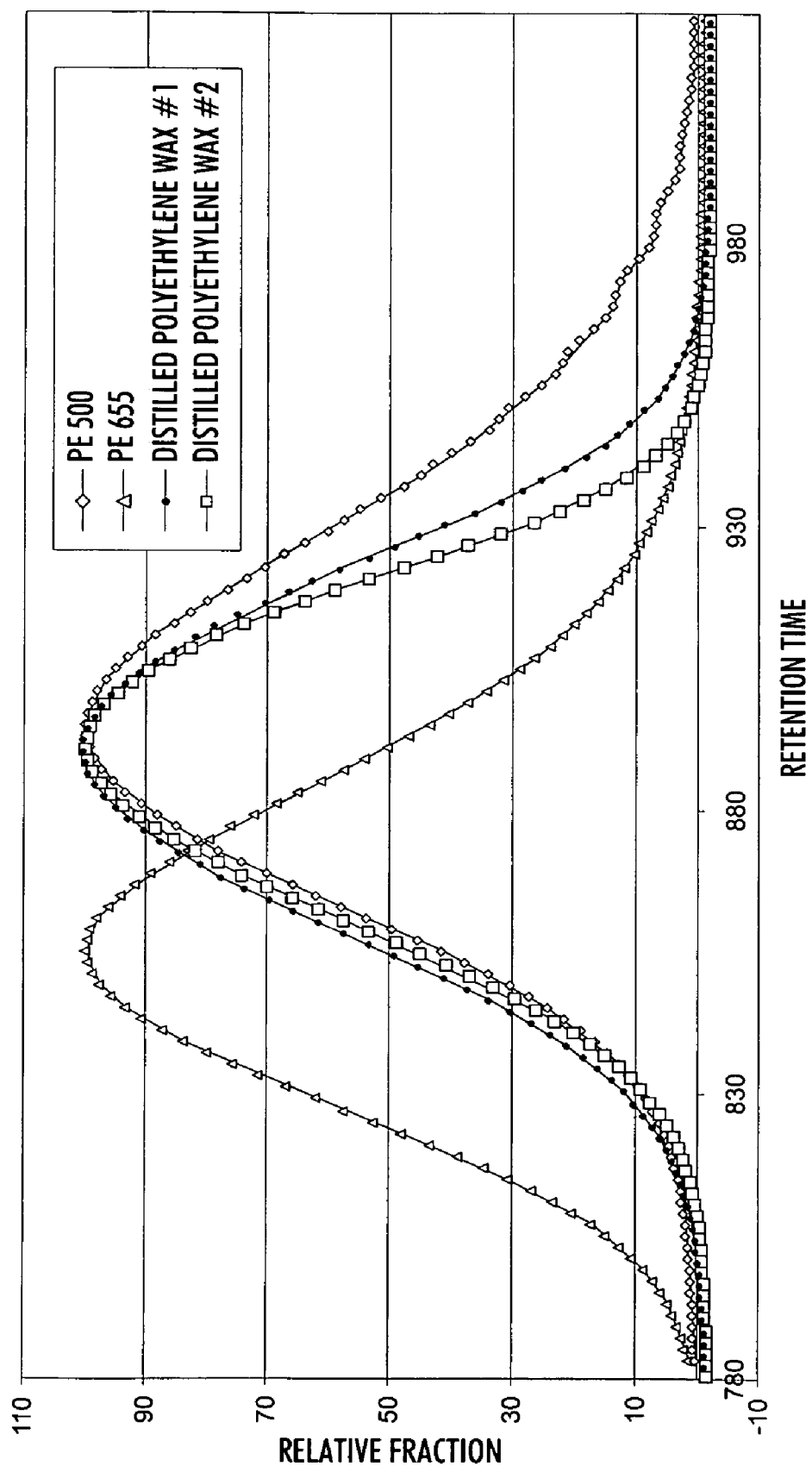

PHASE CHANGE INKS

CROSS-REFERENCE TO RELATED APPLICATIONS

Copending Application U.S. Ser. No. 11/126,745, filed May 11, 2005, entitled "Method of Purification of Polyalkylene Materials," with the named inventors San-Ming Yang, Thomas E. Enright, Val Magdalinis, Ahmed Alzamly, Man C. Tam, Carol A. Jennings, Peter M. Kazmaier, and Marko D. Saban, the disclosure of which is totally incorporated herein by reference, discloses a method of purifying polyalkylene. Also included are microencapsulated Gyricon beads, phase change ink, and toners comprising the purified polyalkylene.

Copending Application U.S. Serial No. 11/291,055, filed concurrently herewith, entitled "Phase Change Inks," with the named inventors Bo Wu, Trevor J. Snyder, Stephan V. Drappel, Jule W. Thomas, Jr., Donald R. Titterington, and C. Geoffrey Allen, the disclosure of which is totally incorporated herein by reference, discloses a phase change ink comprising (a) a colorant and (b) a phase change ink carrier, said carrier comprising (i) a branched triamide and (ii) a polyethylene wax having an average peak molecular weight of from about 350 to about 730 and a polydispersity of from about 1.05 to about 3.0. Also disclosed is a process which comprises (1) incorporating into an ink jet printing apparatus a phase change ink comprising (a) a colorant and (b) a phase change ink carrier, said carrier comprising (i) a branched triamide and (ii) a polyethylene wax having an average peak molecular weight of from about 350 to about 730 and a polydispersity of from about 1.05 to about 3.0; (2) melting the ink; and (3) causing droplets of the melted ink to be ejected in an imagewise pattern onto a substrate.

Copending Application U.S. Ser. No. 11/290,263, filed concurrently herewith, entitled "Phase Change Inks," with the named inventors Bo Wu, Trevor J. Snyder, Jule W. Thomas, Jr., and Patricia Ann Wang, the disclosure of which is totally incorporated herein by reference, discloses a phase change ink comprising (a) a colorant and (b) a phase change ink carrier, said carrier comprising (i) a branched triamide and (ii) a polyethylene wax having an average peak molecular weight of from about 350 to about 730 and a polydispersity of from about 1.0001 to about 1.500. Also disclosed is a process which comprises (1) incorporating into an ink jet printing apparatus a phase change ink comprising (a) a colorant and (b) a phase change ink carrier, said carrier comprising (i) a branched triamide and (ii) a polyethylene wax having an average peak molecular weight of from about 350 to about 730 and a polydispersity of from about 1.0001 to about 1.500; (2) melting the ink; and (3) causing droplets of the melted ink to be ejected in an imagewise pattern onto a substrate.

Copending Application U.S. Ser. No. 11/291,056, filed concurrently herewith, entitled "Colorant Compounds," with the named inventors Jeffery H. Banning, Bo Wu, and C. Wayne Jaeger, the disclosure of which is totally incorporated herein by reference, discloses colorant compounds of the formulae

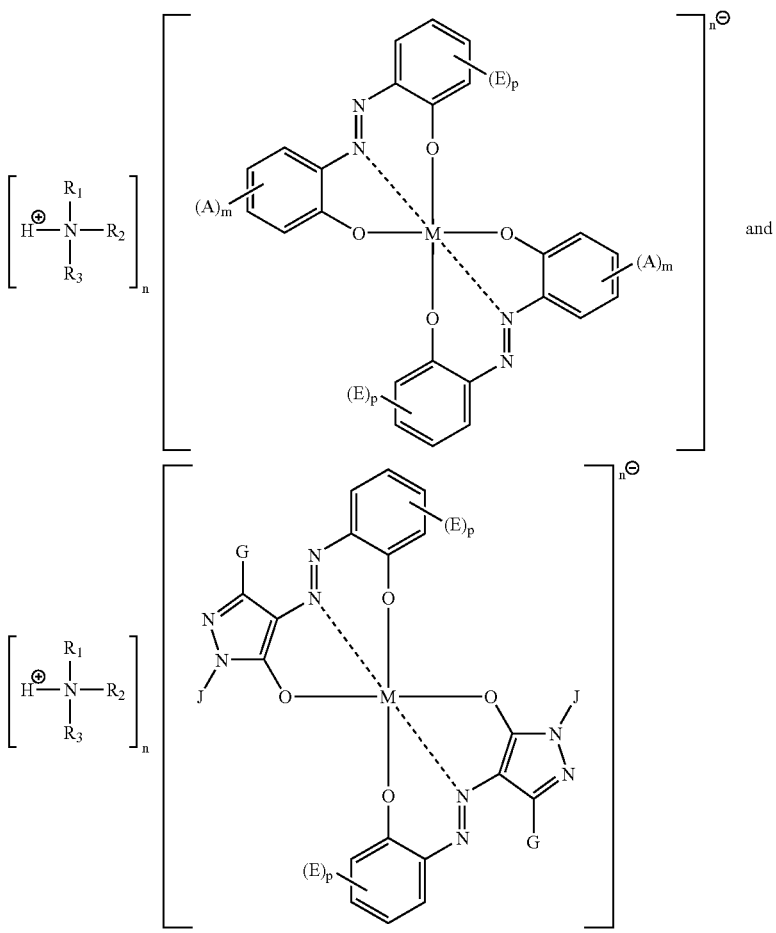

wherein $R_1$, $R_2$, $R_3$, M, A, E, G, J, m, n, and p are as defined therein.

Copending Application U.S. Ser. No. 11/291,057, filed concurrently herewith, entitled "Phase Change Inks," with the named inventors Jeffery H. Banning, Bo Wu, and C. Wayne Jaeger, the disclosure of which is totally incorporated herein by reference, discloses a phase change ink composition comprising a phase change ink carrier and a colorant compound of the formula

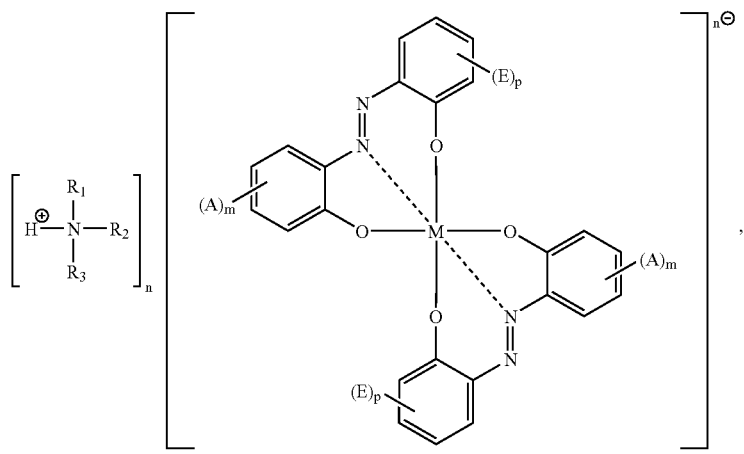

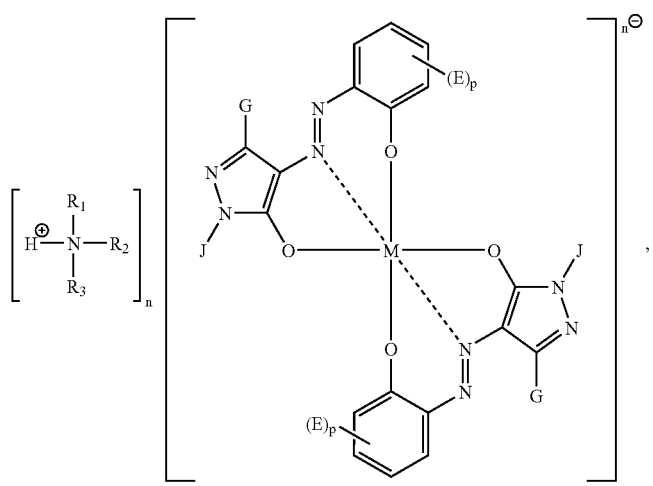

or mixtures thereof, wherein $R_1$, $R_2$, $R_3$, M, A, E, G, J, m, n, and p are as defined therein.

Copending Application U.S. Ser. No. 11/290,258, filed concurrently herewith, entitled "Phase Change Inks Containing Specific Colorants," with the named inventors Bo Wu, Trevor J. Snyder, Jeffery H. Banning, and Jule W. Thomas, Jr., the disclosure of which is totally incorporated herein by reference, discloses a phase change ink composition comprising (a) a phase change ink carrier comprising (1) an amide; and (2) a polyethylene wax having an average peak molecular weight of from about 350 to about 730 and a polydispersity of from about 1.0001 to about 1.5; and (b) a colorant compound of the formula

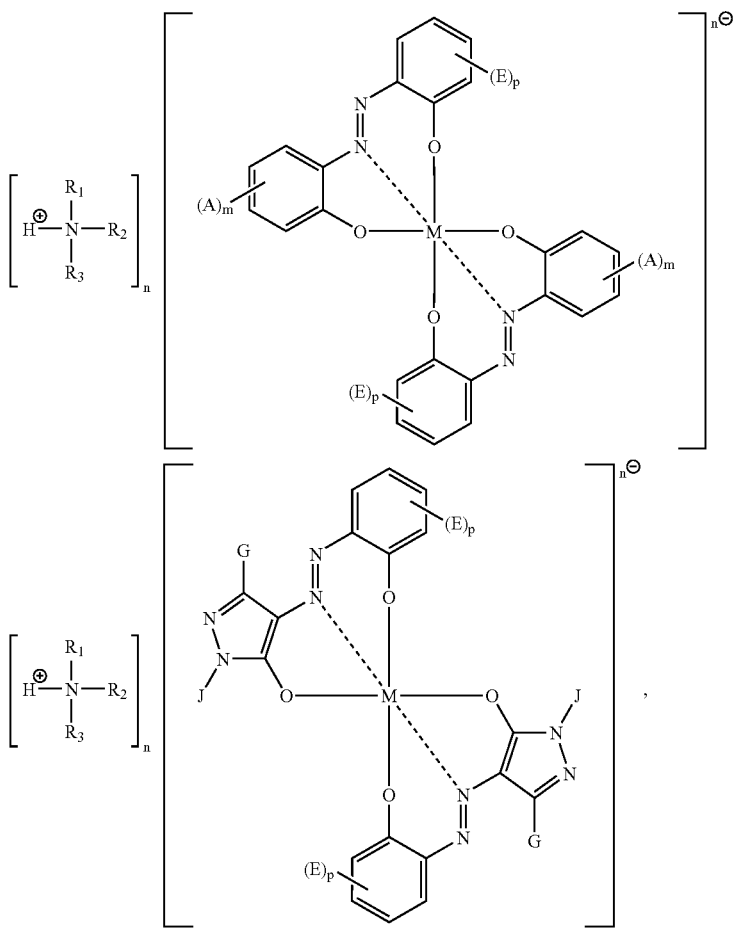

or mixtures thereof, wherein $R_1$, $R_2$, $R_3$, M, A, E, G, J, m, n, and p are as defined therein.

Copending Application U.S. Ser. No. 11/290,265, filed concurrently herewith, entitled "Phase Change Inks," with the named inventors Trevor J. Snyder, Bo Wu, Patricia Ann Wang, Donald R. Titterington, Jule W. Thomas, Jr., Randall R. Bridgeman, and Mark H. Tennant, the disclosure of which is totally incorporated herein by reference, discloses a phase change ink composition comprising an ink carrier and a colorant, said ink being suitable for use in an indirect printing process wherein the ink is jetted from a printhead onto a heated intermediate transfer member and subsequently transferred from the intermediate transfer member to a final recording substrate, wherein: (a) the ink can be jetted from the printhead onto the intermediate transfer member when the ink is maintained at a temperature of about 125° C. or lower; (b) the ink can be jetted without purging from a printer maintained at a standby temperature of about 100° C. or lower; and (c) the ink has a cohesive failure temperature of at least about 54° C.

Copending Application U.S. Ser. No. 11/290,222, filed concurrently herewith, entitled "Phase Change Inks Containing Fischer-Tropsch Waxes," with the named inventors Bo Wu, Patricia Ann Wang, Trevor J. Snyder, and Jule W. Thomas, Jr., the disclosure of which is totally incorporated herein by reference, discloses a phase change ink comprising (a) a colorant and (b) a phase change ink carrier, said carrier comprising (i) an amide and (ii) a Fischer-Tropsch wax having an average peak molecular weight of from about 300 to about 800 and a polydispersity of from about 1.001 to about 3. Also disclosed is a process which comprises (1) incorporating into an ink jet printing apparatus a phase change ink comprising (a) a colorant and (b) a phase change ink carrier, said carrier comprising (i) an amide and (ii) a Fischer-Tropsch wax having an average peak molecular weight of from about 300 to about 800 and a polydispersity of from about 1.001 to about 3; (2) melting the ink; and (3) causing droplets of the melted ink to be ejected in an imagewise pattern onto a substrate.

BACKGROUND

Disclosed herein are hot melt or phase change inks and methods for the use thereof. More specifically, disclosed herein are hot melt or phase change inks particularly suitable for use in phase change ink jet printing processes with reduced energy requirements. One embodiment is directed to a phase change ink comprising (a) a colorant and (b) a phase change ink carrier, said carrier comprising (i) a branched triamide and (ii) a polyethylene wax having an average peak molecular weight of from about 350 to about 730, a polydispersity of from about 1.03 to about 3.0, and an asymmetrical molecular weight distribution skewed toward the high molecular weight end. Another embodiment is directed to a process which comprises (1) incorporating into an ink jet printing apparatus a phase change ink comprising (a) a colorant and (b) a phase change ink carrier, said carrier comprising (i) a branched triamide and (ii) a polyethylene wax having an average peak molecular weight of from about 350 to about 730, a polydispersity of from about 1.03 to about 3.0, and an asymmetrical molecular weight distribution skewed toward the high molecular weight end; (2) melting the ink; and (3) causing droplets of the melted ink to be ejected in an imagewise pattern onto a substrate.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. Nos. 4,889,560, 4,889,761, and 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. U.S. Pat. No. 5,621,022, the disclosure of which is totally incorporated herein by reference, discloses the use of a specific class of polymeric dyes in phase change ink compositions.

Phase change inks have also been used for applications such as postal marking, industrial marking, and labelling.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Compositions suitable for use as phase change ink carrier compositions are known. Some representative examples of references disclosing such materials include U.S. Pat. Nos. 3,653,932, 4,390,369, 4,484,948, 4,684,956, 4,851,045, 4,889,560, 5,006,170, 5,151,120, 5,372,852, 5,496,879, European Patent Publication 0187352, European Patent Publication 0206286, German Patent Publication DE 4205636AL, German Patent Publication DE 4205713AL, and PCT Patent Application WO 94/04619, the disclosures of each of which are totally incorporated herein by reference.

Suitable carrier materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

U.S. Pat. No. 6,860,930 (Wu et al.), the disclosure of which is totally incorporated herein by reference, discloses a phase change ink composition comprising (a) a colorant and (b) a carrier comprising a polyamide, wherein the polyamide component of the carrier contains at least about 10 percent by weight of a branched triamide.

U.S. Patent Publication 2005/0130054 (Yuan et al.), the disclosure of which is totally incorporated herein by reference, discloses wax based inks for phase change/hot melt inkjet printing or thermal transfer printing applications. Also disclosed are waxes useful for toners for use in electrostatographic printing applications. Both materials are prepared using a wax having a narrow melting range. The narrow melting range of the wax reduces energy requirements in printing applications. The use of the waxes also promotes release for high speed printing and especially promotes fast drying in wax based ink applications.

U.S. Pat. No. 6,001,904 (Matzinger et al.), the disclosure of which is totally incorporated herein by reference, discloses phase change (hot melt) ink compositions for use in a phase change (hot melt) ink jet recording device in which recording is conducted by thermally melting the ink at a temperature above ambient temperature (20° C.) to provide prints that possess high quality images, scratch resistance, abrasion resistance, low-temperature storage stability and flexibility, offset and pick resistance, adhesion, and other desired properties to comprise: (a) from about 0.1% to about 30% of one or more colorants; and (b) from about 0.1 to about 99.9% of one or more reversibly-crosslinked-polymers. Components other than those listed above may be included in the ink compositions to achieve specific printer, substrate, or end use requirements. Furthermore, the invention also includes methods for the preparation of reversibly-crosslinked-polymers and for their use in the above-described inks.

While known compositions and processes are suitable for their intended purposes, a need remains for improved phase change ink compositions. In addition, a need remains for phase change inks that can be jetted at temperatures below about 125° C. Further, a need remains for phase change inks that can be jetted with reduced energy requirements. Additionally, a need remains for phase change inks that can be jetted with less expensive printheads. There is also a need for phase change inks that enable improved thermal stability of the inks manifested as the color's stability over time when heated in printers; In addition, there is a need for phase change inks that enable improved printer reliability. Further, there is a need for phase change inks that enable quick recovery times from standby mode. Additionally, there is a need for phase change inks that enable printing with "instant-on" mode. A need also remains for phase change inks that exhibit desirable viscosity values at reduced printing temperatures. In addition, a need remains for phase change inks that enable the aforementioned advantages and also exhibit good printing characteristics, such as transfixing properties (including dither and solid fill dropout performance), acceptable jetting robustness, folding and creasing performance, gloss, color intensity, and the like. Further, a need remains for phase change inks that generate images with improved hardness. Additionally, a need remains for phase change inks that exhibit reduced sweating; sweating is a problem wherein some ink ingredients migrate to the surface of solid ink sticks and aggregate at the ink stick surface inside the printer; the sticky "sweat" gradually drains down to the bottom and can cause the ink sticks to be difficult to slide in the ink load racks in the printers. There is also a need for phase change inks that generate images with reduced showthrough when printed on paper substrates.

SUMMARY

Disclosed herein is a phase change ink comprising (a) a colorant and (b) a phase change ink carrier, said carrier comprising (i) a branched triamide and (ii) a polyethylene wax having an average peak molecular weight of from about 350 to about 730, a polydispersity of from about 1.03 to about 3.0, Another embodiment is directed to a process which comprises (1) incorporating into an ink jet printing apparatus a phase change ink comprising (a) a colorant and (b) a phase change ink carrier, said carrier comprising (i) a branched triamide and (ii) a polyethylene wax having an average peak molecular weight of from about 350 to about 730, a polydispersity of from about 1.03 to about 3.0, and an asymmetrical molecular weight distribution skewed toward the high molecular weight end; (2) melting the ink; and (3) causing droplets of the melted ink to be ejected in an imagewise pattern onto a substrate.

BRIEF DESCRIPTION OF THE DRAWING

The Figure is a reproduction of high temperature gel permeation chromatography (also called size exclusion chromatography (SEC)) curves obtained for polyethylene waxes of different average peak molecular weight values, showing the relative amounts of molecules with different molecular weights present in the sample on the "y" axis and the retention time on the "x" axis.

DETAILED DESCRIPTION

The inks disclosed herein comprise a branched triamide. Branched triamides are disclosed in, for example, U.S. Pat. No. 6,860,930, the disclosure of which is totally incorporated herein by reference. By "branched triamide" is meant that the structure of the triamide can be drawn so that each amide group is bonded to an atom or group of atoms contained in a branch other than that of the others, and that each amide group is in a different branch. By "each amide group is in a different branch" is meant that the triamide is not linear; by "linear" is meant a molecule wherein all three amide groups can be drawn as being in the same molecular chain or branch, such as linear triamides of the formulae

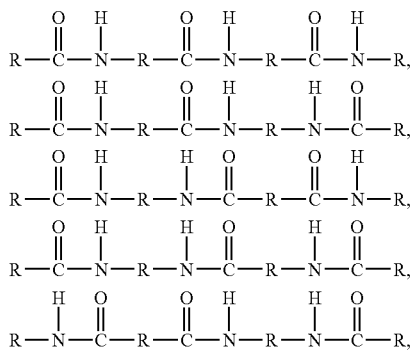

or the like. For purposes of the present invention, linear triamides include those wherein a line can be drawn through the three amide groups, even if one would ordinarily draw a different line. For example, a compound of the formula

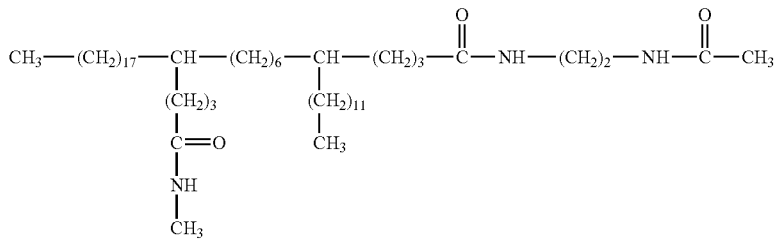

is considered a linear compound for purposes of the present invention, because it can also be drawn as follows:

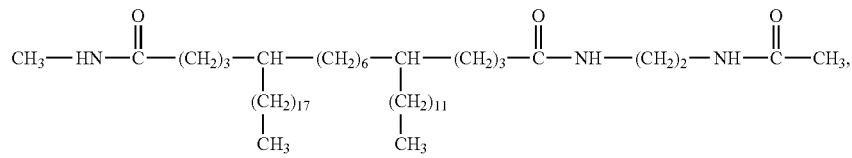

and accordingly would not be considered to be a branched triamide for the purposes of the inks discloses herein. For purposes of the inks disclosed herein, "branched triamides", "branched triacids", "branched monoamino diacids", and "branched diamino monoacids" have similar definitions in that each of the three functional groups named can be drawn as being in a different branch from the other two.

Examples of suitable branched triamides include (but are not limited to) those generated from branched triamines, said branched triamides being of the formula

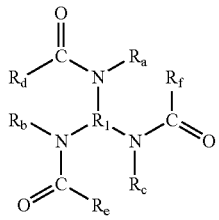

wherein $R_1$ is (i) an alkylene group (including linear, branched, saturated, unsaturated, cyclic, acyclic, substituted, and unsubstituted alkylene groups, and wherein hetero atoms, such as oxygen, nitrogen, sulfur, silicon, phosphorus, boron, and the like either may or may not be present in the alkylene group), in one embodiment with at least about 3 carbon atoms, in another embodiment with at least about 4 carbon atoms, in yet another embodiment with at least about 5 carbon atoms, in another embodiment with at least about 15 carbon atoms, and in yet another embodiment with at least about 21 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (ii) an arylene group (including unsubstituted and substituted arylene groups, and wherein hetero atoms, such as oxygen, nitrogen, sulfur, silicon, phosphorus, boron, and the like either may or may not be present in the arylene group), in one embodiment with at least about 6 carbon atoms, in another embodiment with at least about 10 carbon atoms, and in yet another embodiment with at least about 14 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (iii) an arylalkylene group (including unsubstituted and substituted arylalkylene groups, wherein the alkyl portion of the arylalkylene group can be linear, branched, saturated, unsaturated, cyclic, and/or acyclic, and wherein hetero atoms, such as oxygen, nitrogen, sulfur, silicon, phosphorus, boron, and the like either may or may not be present in either or both of the alkyl portion and the aryl portion of the arylalkylene group), in one embodiment with at least about 7 carbon atoms, in another embodiment with at least about 8 carbon atoms, and in yet another embodiment with at least about 9 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as benzylene or the like, or (iv) an alkylarylene group (including unsubstituted and substituted alkylarylene groups, wherein the alkyl portion of the alkylarylene group can be linear, branched, satu-rated, unsaturated, cyclic, and/or acyclic, and wherein hetero atoms, such as oxygen, nitrogen, sulfur, silicon, phosphorus, boron, and the like either may or may not be present in either or both of the alkyl portion and the aryl portion of the alkylarylene group), in one embodiment with at least about 7 carbon atoms, in another embodiment with at least about 8 carbon atoms, and in yet another embodiment with at least about 9 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as tolylene or the like, $R_a$, $R_b$, and $R_c$ each, independently of the others, is (i) a hydrogen atom, (ii) an alkyl group (including linear, branched, saturated, unsaturated, cyclic, acyclic, substituted, and unsubstituted alkyl groups, and wherein hetero atoms, such as oxygen, nitrogen, sulfur, silicon, phosphorus, boron, and the like either may or may not be present in the alkyl group), in one embodiment with at least 1 carbon atom, in another embodiment with at least about 2 carbon atoms, in yet another embodiment with at least about 6 carbon atoms, in another embodiment with at least about 7 carbon atoms, and in yet another embodiment with at least about 10 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (iii) an aryl group (including unsubstituted and substituted aryl groups, and wherein hetero atoms, such as oxygen, nitrogen, sulfur, silicon, phosphorus, boron, and the like either may or may not be present in the aryl group), in one embodiment with at least about 6 carbon atoms, in another embodiment with at least about 10 carbon atoms, and in yet another embodiment with at least about 14 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (iv) an arylalkyl group (including unsubstituted and substituted arylalkyl groups, wherein the alkyl portion of the arylalkyl group can be linear, branched, saturated, unsaturated, cyclic, and/or acyclic, and wherein hetero atoms, such as oxygen, nitrogen, sulfur, silicon, phosphorus, boron, and the like either may or may not be present in either or both of the alkyl portion and the aryl portion of the arylalkyl group), in one embodiment with at least about 6 carbon atoms, in another embodiment with at least about 7 carbon atoms, and in yet another embodiment with at least about 8 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as benzyl or the like, or (v) an alkylaryl group (including unsubstituted and substituted alkylaryl groups, wherein the alkyl portion of the alkylaryl group can be linear, branched, saturated, unsaturated, cyclic, and/or acyclic, and wherein hetero atoms, such as oxygen, nitrogen, sulfur, silicon, phosphorus, boron, and the like either may or may not be present in either or both of the alkyl portion and the aryl portion of the alkylaryl group), in one embodiment with at least about 6 carbon atoms, in another embodiment with at least about 7 carbon atoms, and in yet another embodiment with at least about 8 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as tolyl or the like, $R_d$, $R_e$, and $R_f$ each, independently of the others, is (i) an alkyl group (including linear, branched, saturated, unsaturated, cyclic, acyclic, substituted, and unsubstituted alkyl groups, and wherein hetero atoms, such as oxygen, nitrogen, sulfur, silicon, phosphorus, boron, and the like either may or may not be present in the alkyl group), in one embodiment with at least 1 carbon atom, in another embodiment with at least about 2 carbon atoms, in yet another embodiment with at least about 6 carbon atoms, in another embodiment with at least about 17 carbon atoms, and in yet another embodiment with at least about 36 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (ii) an aryl group (including unsubstituted and substituted aryl groups, and wherein hetero atoms, such as oxygen, nitrogen, sulfur, silicon, phosphorus, boron, and the like either may or may not be present in the aryl group), in one embodiment with at least about 6 carbon atoms, in another embodiment with at least about 10 carbon atoms, and in yet another embodiment with at least about 14 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (iii) an arylalkyl group (including unsubstituted and substituted arylalkyl groups, wherein the alkyl portion of the arylalkyl group can be linear, branched, saturated, unsaturated, cyclic, and/or acyclic, and wherein hetero atoms, such as oxygen, nitrogen, sulfur, silicon, phosphorus, boron, and the like either may or may not be present in either or both of the alkyl portion and the aryl portion of the arylalkyl group), in one embodiment with at least about 6 carbon atoms, in another embodiment with at least about 7 carbon atoms, and in yet another embodiment with at least about 8 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as benzyl or the like, or (iv) an alkylaryl group (including unsubstituted and substituted alkylaryl groups, wherein the alkyl portion of the alkylaryl group can be linear, branched, saturated, unsaturated, cyclic, and/or acyclic, and wherein hetero atoms, such as oxygen, nitrogen, sulfur, silicon, phosphorus, boron, and the like either may or may not be present in either or both of the alkyl portion and the aryl portion of the alkylaryl group), in one embodiment with at least about 6 carbon atoms, in another embodiment with at least about 7 carbon atoms, and in yet another embodiment with at least about 8 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as tolyl or the like, those generated from branched triacids, said branched triamides being of the formula

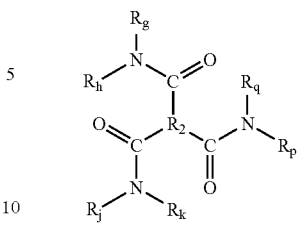

wherein $R_2$ is (i) an alkylene group (including linear, branched, saturated, unsaturated, cyclic, acyclic, substituted, and unsubstituted alkylene groups, and wherein hetero atoms, such as oxygen, nitrogen, sulfur, silicon, phosphorus, boron, and the like either may or may not be present in the alkylene group), in one embodiment with at least about 3 carbon atoms, in another embodiment with at least about 4 carbon atoms, in yet another embodiment with at least about 5 carbon atoms, in another embodiment with at least about 15 carbon atoms, and in yet another embodiment with at least about 21 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (ii) an arylene group (including unsubstituted and substituted arylene groups, and wherein hetero atoms, such as oxygen, nitrogen, sulfur, silicon, phosphorus, boron, and the like either may or may not be present in the arylene group), in one embodiment with at least about 6 carbon atoms, in another embodiment with at least about 10 carbon atoms, and in yet another embodiment with at least about 14 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (iii) an arylalkylene group (including unsubstituted and substituted arylalkylene groups, wherein the alkyl portion of the arylalkylene group can be linear, branched, saturated, unsaturated, cyclic, and/or acyclic, and wherein hetero atoms, such as oxygen, nitrogen, sulfur, silicon, phosphorus, boron, and the like either may or may not be present in either or both of the alkyl portion and the aryl portion of the arylalkylene group), in one embodiment with at least about 7 carbon atoms, in another embodiment with at least about 8 carbon atoms, and in yet another embodiment with at least about 9 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as benzylene or the like, or (iv) an alkylarylene group (including unsubstituted and substituted alkylarylene groups, wherein the alkyl portion of the alkylarylene group can be linear, branched, saturated, unsaturated, cyclic, and/or acyclic, and wherein hetero atoms, such as oxygen, nitrogen, sulfur, silicon, phosphorus, boron, and the like either may or may not be present in either or both of the alkyl portion and the aryl portion of the alkylarylene group), in one embodiment with at least about 7 carbon atoms, in another embodiment with at least about 8 carbon atoms, and in yet another embodiment with at least about 9 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as tolylene or the like, $R_g$, $R_j$, and $R_p$ each, independently of the others, is (i) a hydrogen atom, (ii) an alkyl group (including linear, branched, saturated, unsaturated, cyclic, acyclic, substituted, and unsubstituted alkyl groups, and wherein hetero atoms, such as oxygen, nitrogen, sulfur, silicon, phosphorus, boron, and the like either may or may not be present in the alkyl group), in one embodiment with at least about 1 carbon atom, in another embodiment with at least about 2 carbon atoms, in yet another embodiment with at least about 3 carbon atoms, in another embodiment with at least about 6 carbon atoms, and in yet another embodiment with at least about 18 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (iii) an aryl group (including unsubstituted and substituted aryl groups, and wherein hetero atoms, such as oxygen, nitrogen, sulfur, silicon, phosphorus, boron, and the like either may or may not be present in the aryl group), in one embodiment with at least about 6 carbon atoms, in another embodiment with at least about 10 carbon atoms, and in yet another embodiment with at least about 14 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (iv) an arylalkyl group (including unsubstituted and substituted arylalkyl groups, wherein the alkyl portion of the arylalkyl group can be linear, branched, saturated, unsaturated, cyclic, and/or acyclic, and wherein hetero atoms, such as oxygen, nitrogen, sulfur, silicon, phosphorus, boron, and the like either may or may not be present in either or both of the alkyl portion and the aryl portion of the arylalkyl group), in one embodiment with at least about 7 carbon atoms, in another embodiment with at least about 8 carbon atoms, and in yet another embodiment with at least about 9 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as benzyl or the like, or (v) an alkylaryl group (including unsubstituted and substituted alkylaryl groups, wherein the alkyl portion of the alkylaryl group can be linear, branched, saturated, unsaturated, cyclic, and/or acyclic, and wherein hetero atoms, such as oxygen, nitrogen, sulfur, silicon, phosphorus, boron, and the like either may or may not be present in either or both of the alkyl portion and the aryl portion of the alkylaryl group), in one embodiment with at least about 7 carbon atoms, in another embodiment with at least about 8 carbon atoms, and in yet another embodiment with at least about 9 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as tolyl or the like, $R_h$, $R_k$, and $R_q$ each, independently of the others, is (i) a hydrogen atom, (ii) an alkyl group (including linear, branched, saturated, unsaturated, cyclic, acyclic, substituted, and unsubstituted alkyl groups, and wherein hetero atoms, such as oxygen, nitrogen, sulfur, silicon, phosphorus, boron, and the like either may or may not be present in the alkyl group), in one embodiment with at least about 1 carbon atom, in another embodiment with at least about 2 carbon atoms, in yet another embodiment with at least about 3 carbon atoms, in another embodiment with at least about 4 carbon atoms, and in yet another embodiment with at least about 5 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (iii) an aryl group (including unsubstituted and substituted aryl groups, and wherein hetero atoms, such as oxygen, nitrogen, sulfur, silicon, phosphorus, boron, and the like either may or may not be present in the aryl group), in one embodiment with at least about 6 carbon atoms, in another embodiment with at least about 7 carbon atoms, and in yet another embodiment with at least about 8 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (iv) an arylalkyl group (including unsubstituted and substituted arylalkyl groups, wherein the alkyl portion of the arylalkyl group can be linear, branched, saturated, unsaturated, cyclic, and/or acyclic, and wherein hetero atoms, such as oxygen, nitrogen, sulfur, silicon, phosphorus, boron, and the like either may or may not be present in either or both of the alkyl portion and the aryl portion of the arylalkyl group), in one embodiment with at least about 7 carbon atoms, in another embodiment with at least about 8 carbon atoms, and in yet another embodiment with at least about 9 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as benzyl or the like, or (v) an alkylaryl group (including unsubstituted and substituted alkylaryl groups, wherein the alkyl portion of the alkylaryl group can be linear, branched, saturated, unsaturated, cyclic, and/or acyclic, and wherein hetero atoms, such as oxygen, nitrogen, sulfur, silicon, phosphorus, boron, and the like either may or may not be present in either or both of the alkyl portion and the aryl portion of the alkylaryl group), in one embodiment with at least about 7 carbon atoms, in another embodiment with at least about 8 carbon atoms, and in yet another embodiment with at least about 9 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as tolyl or the like, those generated from branched diamino monoacid compounds, said branched triamides being of the formula

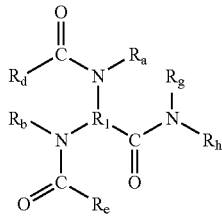

wherein $R_1$, $R_a$, $R_b$, $R_d$, $R_e$, $R_g$, and $R_h$ are as defined hereinabove, those generated from branched monoamino diacid compounds, said branched triamides being of the formula

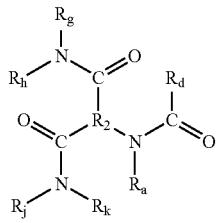

wherein $R_2$, $R_a$, $R_d$, $R_g$, $R_h$, $R_j$, and $R_k$ are as defined hereinabove, and the like, wherein the substituents on the substituted alkyl, alkylene, aryl, arylene, arylalkyl, arylalkylene, alkylaryl, and alkylarylene groups can be (but are not limited to) hydroxy groups, halogen atoms, imine groups, ammonium groups, cyano groups, pyridine groups, pyridinium groups, ether groups, aldehyde groups, ketone groups, ester groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, azide groups, azo groups, cyanato groups, carboxylate groups, mixtures thereof, and the like, wherein two or more substituents can be joined together to form a ring.

In one specific embodiment, when the triamide is of the formula

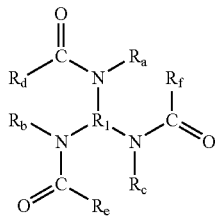

the total number of carbon atoms in $R_1+R_a+R_b+R_c+R_d+R_e+R_f$ is at least about 7, in another embodiment at least about 10, and in yet another embodiment at least about 12, and in one embodiment no more than about 500, in another embodiment no more than about 350, and in yet another embodiment no more than about 300, although the total number of carbon atoms can be outside of these ranges. In another specific embodiment, each of $R_a$, $R_d$, $R_b$, $R_e$, $R_c$, and $R_f$, independently of the others, has no more than about 50 carbon atoms, and in yet another specific embodiment no more than about 48 carbon atoms, although the number of carbon atoms can be outside of these ranges.

In one specific embodiment, when the triamide is of the formula

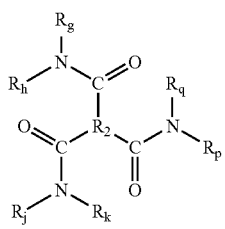

the total number of carbon atoms in $R_2+R_g+R_h+R_j+R_k+R_p+R_q$ is at least about 7, in another embodiment at least about 10, and in yet another embodiment at least about 12, and in one embodiment no more than about 500, in another embodiment no more than about 350, and in yet another embodiment no more than about 300, although the total number of carbon atoms can be outside of these ranges. In another specific embodiment, each of $R_g$, $R_h$, $R_j$, $R_k$, $R_p$, and $R_q$, independently of the others, has no more than about 50 carbon atoms, and in yet another specific embodiment no more than about 48 carbon atoms, although the number of carbon atoms can be outside of these ranges.

In one specific embodiment, when the triamide is of the formula

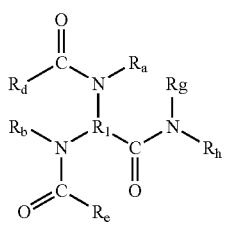

the total number of carbon atoms in $R_1+R_a+R_b+R_d+R_e+R_g+R_h$ is at least about 7, in another embodiment at least about 10, and in yet another embodiment at least about 12, and in one embodiment no more than about 500, in another embodiment no more than about 350, and in yet another embodiment no more than about 300, although the total number of carbon atoms can be outside of these ranges. In another specific embodiment, each of $R_a$, $R_d$, $R_b$, $R_e$, $R_g$, and $R_h$, independently of the others, has no more than about 50 carbon atoms, and in yet another specific embodiment no more than about 48 carbon atoms, although the number of carbon atoms can be outside of these ranges.

In one specific embodiment, when the triamide is of the formula

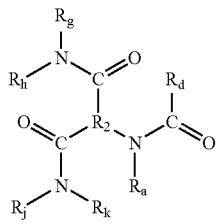

the total number of carbon atoms in $R_2+R_a+R_d+R_g+R_h+R_j+R_k$ is at least about 7, in another embodiment at least about 10, and in yet another embodiment at least about 12, and in one embodiment no more than about 500, in another embodiment no more than about 350, and in yet another embodiment no more than about 300, although the total number of carbon atoms can be outside of these ranges. In another specific embodiment, each of $R_a$, $R_d$, $R_g$, $R_h$, $R_j$, and $R_k$, independently of the others, has no more than about 50 carbon atoms, and in yet another specific embodiment no more than about 48 carbon atoms, although the number of carbon atoms can be outside of these ranges.

It must be emphasized that not all of the amide groups in the first formula need to be directly bonded to the same atom in the $R_1$ or $R_2$ group, and in one specific embodiment of the present invention, each amide group is bonded to a different atom in the $R_1$ or $R_2$ group.

In one specific embodiment, the branched triamide is of the formula

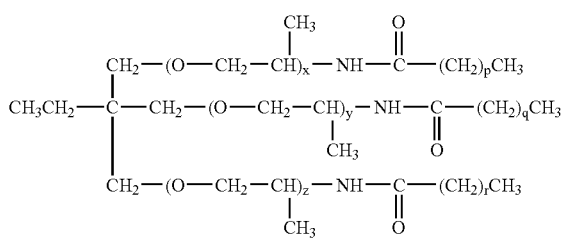

wherein x, y, and z each, independently represent the number of propyleneoxy repeat units and x+y+z is from about 5 to about 6, and wherein p, q, and r each, independently of the others, are integers representing the number of repeat —(CH$_2$)—units and are in one embodiment at least about 15, in another embodiment is at least about 20, and in another embodiment is at least about 26, and are one embodiment no more than about 60, in another embodiment are no more than about 55, and are in yet another embodiment no more than about 45, although the value of p, q, and r can be outside of these ranges. The triamide composition is frequently obtained as a mixture of materials, wherein p, q, and r are each peak average chain length numbers within the composition, rather than uniform compositions wherein each molecule has the same value for p, q, and r, and it must be understood that within the mixture, some individual chains may be longer or shorter than the given numbers.

The triamide is present in the ink in any desired or effective amount, in one embodiment at least about 2 percent by weight of the phase change ink carrier, in another embodiment at least about 5 percent by weight of carrier, and in yet another embodiment at least about 10 percent by weight of the carrier, and in one embodiment no more than about 50 percent by weight of the carrier, in another embodiment no more than about 40 percent by weight of the carrier, and in yet another embodiment no more than about 35 percent by weight of the carrier, although the amount can be outside of these ranges.

The phase change inks disclosed herein also contain a polyethylene wax. This polyethylene wax has an average peak molecular weight, as measured by high temperature gel permeation chromatography, of in one embodiment at least about 350, in another embodiment at least about 400, and in yet another embodiment at least about 470, and in one embodiment no more than about 730, in another embodiment no more than about 700, and in yet another embodiment no more than about 600, although the average peak molecular weight can be outside of these ranges.

The polyethylene wax has a polydispersity (determined by dividing weight average molecular weight by number average molecular weight) in one embodiment of at least about 1.03, and in one embodiment of no more than about 2.5, in another embodiment of no more than about 2.0, and in yet another embodiment of no more than about 1.8, although the polydispersity can be outside of these ranges.

The polyethylene wax has a peak melting point (as measured by differential scanning calorimetry (DSC)) in one embodiment of at least about 50° C., in another embodiment at least about 60° C., and in yet another embodiment of at least about 70° C., and in one embodiment of no more than about 130° C., in another embodiment of no more than about 125° C., and in yet another embodiment of no more than about 120° C., although the peak melting point can be outside of these ranges.

The polyethylene wax has an onset melting point (as measured by differential scanning calorimetry (DSC)) in one embodiment of at least about 45° C., in another embodiment at least about 50° C., and in yet another embodiment of at least about 55° C., and in one embodiment of no more than about 71° C., in another embodiment of no more than about 70° C., and in yet another embodiment of no more than about 69° C., although the onset melting point can be outside of these ranges.

The polyethylene wax has a melting range, which is defined as the difference between ending melting point and onset melting point as defined in ASTM D3418-03, in one embodiment of at least about 20° C., in another embodiment at least about 25° C., and in yet another embodiment of at least about 27° C., and in one embodiment of no more than about 40° C., in another embodiment of no more than about 390° C., and in yet another embodiment of no more than about 38° C., although the melting range can be outside of these ranges.

The polyethylene wax has a freezing point (as measured by differential scanning calorimetry (DSC)) in one embodiment of at least about 40° C., in another embodiment at least about 50° C., and in yet another embodiment of at least about 55° C., and in one embodiment of no more than about 83° C., in another embodiment of no more than about 81° C., and in yet another embodiment of no more than about 80° C., although the freezing point can be outside of these ranges.

The polyethylene wax has a viscosity at about 110° C. in one embodiment of at least about 3 centipoise, in another embodiment of at least about 4 centipoise, and in yet another embodiment of at least about 4.5 centipoise, and in one embodiment of no more than about 10 centipoise, in another embodiment of no more than about 9 centipoise, and in yet another embodiment of no more than about 8 centipoise, although the viscosity can be outside of these ranges.

By "average peak molecular weight" is meant that the polyethylene wax, while comprising a mixture of molecules of the formula —$(CH_2)_n$— wherein n is an integer representing the number of repeat —$CH_2$— units, has a distribution of molecules such that a plot of the relative amount of molecules versus the retention time or molecular weight would appear as a bell curve, wherein the peak of the bell curve represents the average peak molecular weight. In contrast, polyethylene waxes having a different average peak molecular weight value, while they may contain materials that overlap in the value of "n", will have different characteristics.

Shown in the Figure are measurements of molecular weight taken for some polyethylene waxes by high temperature gel permeation chromatography with a Polymer Labs 220HT system using refractive index detection, a mobile phase of 1,2,4-trichlorobenzene, and two Polymer 3 μm Mixed-E columns for separation. The entire system and the sample solution before injection were heated to 140° C. The molecular weights were characterized using polyethylene standards for calibration. The materials were two polyethylene waxes commercially available from Baker Petrolite, Tulsa, Okla., one being POLYWAX 500 (PE 500) and one being POLYWAX 655 (PE 655). Also measured was a polyethylene wax (Wax #1) obtained from Baker Petrolite, Tulsa, Okla., similar to POLYWAX 500 but having had removed by distillation the lowest 10 percent molecular weight fraction. This distillation can be carried out as described in, for example, U.S. Patent Publication No. 2005/0130054, the disclosure of which is totally incorporated herein by reference. A second distilled polyethylene wax was also provided for this example. Wax #2 was obtained from Baker Petrolite, Tulsa, OK, and was similar to POLYWAX 500 but was distilled to remove the lowest 15 percent molecular weight fraction therefrom. Some of the data for the retention times of these materials were as follows. Note that in this instance, the x-axis is "reversed" in that the high molecular weight materials appear on the left and the low molecular weight materials appear on the right. Negative numbers are attributable to instrument calibration, and data on the y-axis reflect relative amounts.

| retention times (sec.) | PE 500 | distilled polyethylene wax #1 | distilled polyethylene wax #2 | PE 655 |
|---|---|---|---|---|
| 750 | 0.1 | −1.4 | −1.8 | −0.7 |
| 755 | 0.2 | −1.4 | −1.8 | −0.6 |
| 760 | 0.2 | −1.4 | −1.8 | −0.4 |
| 765 | 0.2 | −1.4 | −1.8 | −0.1 |
| 770 | 0.3 | −1.3 | −1.7 | 0.1 |
| 775 | 0.3 | −1.3 | −1.6 | 0.6 |
| 780 | 0.4 | −1.2 | −1.4 | 1.2 |
| 785 | 0.6 | −1.2 | −1.2 | 2.1 |
| 790 | 0.8 | −1.0 | −1.0 | 3.6 |
| 795 | 1.0 | −0.8 | −0.6 | 6.0 |
| 800 | 1.3 | −0.5 | −0.1 | 9.7 |
| 805 | 1.8 | 0.0 | 0.6 | 14.8 |
| 810 | 2.3 | 0.6 | 1.5 | 21.8 |
| 815 | 3.2 | 1.7 | 2.8 | 30.6 |
| 820 | 4.5 | 3.2 | 4.8 | 41.1 |
| 825 | 6.3 | 5.6 | 7.5 | 52.6 |
| 830 | 8.9 | 8.9 | 11.4 | 64.5 |
| 835 | 12.6 | 13.5 | 16.5 | 75.9 |
| 840 | 17.6 | 19.6 | 23.1 | 85.8 |
| 845 | 24.1 | 27.1 | 30.9 | 93.5 |
| 850 | 32.0 | 35.9 | 40.0 | 98.3 |
| 855 | 41.3 | 45.9 | 50.0 | 100.0 |
| 860 | 51.4 | 56.5 | 60.4 | 98.6 |
| 865 | 61.9 | 67.2 | 70.6 | 94.3 |
| 870 | 72.2 | 77.3 | 80.1 | 87.8 |

-continued

| retention times (sec.) | PE 500 | distilled polyethylene wax #1 | distilled polyethylene wax #2 | PE 655 |
|---|---|---|---|---|
| 875 | 81.7 | 86.2 | 88.2 | 79.7 |
| 880 | 89.6 | 93.2 | 94.4 | 70.6 |
| 885 | 95.5 | 97.9 | 98.4 | 61.2 |
| 890 | 99.0 | 99.9 | 99.9 | 52.0 |
| 891 | 99.4 | 100.0 | 100.0 | 50.3 |
| 895 | 100.0 | 99.1 | 99.0 | 43.4 |
| 900 | 98.6 | 95.4 | 95.9 | 35.7 |
| 905 | 95.0 | 89.0 | 90.4 | 28.7 |
| 910 | 89.7 | 79.8 | 82.6 | 22.8 |
| 915 | 82.8 | 67.9 | 73.6 | 17.9 |
| 920 | 75.0 | 54.8 | 63.6 | 13.9 |
| 925 | 67.4 | 41.2 | 51.9 | 10.5 |
| 930 | 58.8 | 28.0 | 41.8 | 8.0 |
| 935 | 51.2 | 17.8 | 30.7 | 5.7 |
| 940 | 43.9 | 9.7 | 22.3 | 4.3 |
| 945 | 36.7 | 4.9 | 14.5 | 2.9 |
| 950 | 31.3 | 1.8 | 9.2 | 2.0 |
| 955 | 25.2 | 0.3 | 4.9 | 1.2 |
| 960 | 21.4 | −0.6 | 2.6 | 0.8 |
| 965 | 16.9 | −1.0 | 0.5 | 0.2 |
| 970 | 13.5 | −1.3 | −0.2 | 0.1 |
| 975 | 11.4 | −1.4 | −1.1 | −0.3 |
| 980 | 7.4 | −1.5 | −1.4 | −0.4 |
| 985 | 6.8 | −1.5 | −1.7 | −0.6 |
| 990 | 4.4 | −1.6 | −1.9 | −0.8 |
| 995 | 2.9 | −1.6 | −1.9 | −0.7 |
| 1000 | 2.6 | −1.6 | −2.0 | −0.9 |
| 1005 | 1.5 | −1.6 | −2.1 | −0.9 |
| 1010 | 0.9 | −1.7 | −2.0 | −0.9 |
| 1015 | 0.9 | −1.7 | −2.1 | −0.9 |
| 1020 | 0.6 | −1.7 | −2.1 | −1.1 |
| 1025 | 0.4 | −1.7 | −2.3 | −1.1 |
| 1030 | 0.4 | −1.8 | −2.6 | −1.5 |
| 1035 | 0.7 | −2.1 | −3.1 | −2.0 |
| 1040 | 0.9 | −2.6 | −3.1 | −2.2 |
| 1045 | 0.8 | −2.7 | −2.6 | −1.6 |

As measured by high temperature gel permeation chromatography, the peak average molecular weight ($M_p$), number average molecular weight ($M_n$) weight average molecular weight ($M_w$), and polydispersity (MWD) as measured by high temperature gel permeation chromatography for these waxes as follows:

| | $M_p$ | $M_n$ | $M_w$ | MWD |
|---|---|---|---|---|
| PE 500 | 572 | 516 | 570 | 1.10 |
| distilled polyethylene wax #1 | 582 | 574 | 613 | 1.07 |
| distilled polyethylene wax #2 | 611 | 613 | 646 | 1.05 |
| PE 655 | 795 | 729 | 785 | 1.08 |

Peak melting point (° C., as measured by differential scanning calorimetry using a DUPONT 2100 calorimeter according to ASTM D 3418-03), onset melting point (° C., as measured by differential scanning calorimetry), viscosity at 110° C. (centipoise, measured using a Rheometric Scientific DSR-2000 cone-plate rheometer), and skew of the high temperature gel permeation chromatography data of these waxes were as follows:

| | peak MP | onset MP | viscosity | skew |
|---|---|---|---|---|
| PE 500 | 81.2 | 52.5 | 5.44 | 0.21 |
| distilled polyethylene wax #1 | 82.8 | 57.4 | 6.03 | −0.16 |

|  | peak MP | onset MP | viscosity | skew |
|---|---|---|---|---|
| distilled polyethylene wax # 2 | 86.0 | 66.3 | 6.65 | −0.26 |
| PE 655 | 94.6 | 72.3 | 9.80 | 0.35 |

As can be seen from the Figure, for the polyethylene waxes from which some of the lower molecular weight fraction has been removed, the bell-shaped curve representing the plot of relative amounts of molecules with different molecular weights on the "y" axis versus retention time on the "x" axis is asymmetrical or skewed. In contrast, for the commercial waxes, these bell-shaped curves, while not perfectly symmetrical, are relatively unskewed compared to the curves for the polyethylene waxes from which some of the lower molecular weight fraction has been removed.

The polyethylene wax in the inks disclosed herein have had some of the lowest molecular weight fraction removed therefrom, in one embodiment at least about the lowest 5 percent molecular weight fraction removed therefrom, in another embodiment at least about the lowest 7.5 percent molecular weight fraction removed therefrom, in yet another embodiment at least about the lowest 10 percent molecular weight fraction removed therefrom, in still another embodiment, at least about the lowest 12.5 molecular weight fraction removed therefrom, and in yet still another embodiment at least about the lowest 15 percent molecular weight fraction removed therefrom, although the amount removed therefrom can be outside of these ranges.

The low molecular weight fraction can be removed from the polyethylene wax by any desired or effective method, including (but not limited to) the distillation methods described in U.S. Patent Publication No. 2005/0130054, the disclosure of which is totally incorporated herein by reference, the purification methods set forth in Copending Application Ser. No. 11/126,745, the disclosure of which is totally incorporated herein by reference, or the like.

As a result of the low molecular weight fraction having been removed, a molecular weight distribution curve for the polyethylene wax, measured by standard analytical methods, such as high temperature gas chromatography (HT-GC), high temperature gel permeation chromatography (HT-GPC) as illustrated hereinabove, high performance liquid chromatography, also known as high pressure liquid chromatography (HPLC), any other chromatographic method used for analysis, or the like, will be asymmetrical. This asymmetry is referred to as "skew". In a typical x-y axis plot having x-axis values increasing from left to right, a bell-shaped curve having a relatively sharp drop on the left and a trailing tail on the right (toward higher x values) is said to have positive skew, whereas a bell-shaped curve having a trailing tail on the left (toward lower x values) and a relatively sharp drop on the right is said to have negative skew.

The typical instrument output of a chromatograph consists of a diagram in which the intensity of a physical property, which is proportional relative amounts of molecules with different molecular weights present in the sample, is plotted on the "y" axis and retention time on the "x" axis. As is seen in the results from high temperature gel permeation chromatography, retention time is inversely proportional to molecular weight. Hence, the high molecular weight materials appear on the left and the low molecular weight materials appear on the right of the instrument output diagram.

Mathematical theory expresses "skewness" $\gamma_1$ of a probability (distribution-) function P(x) as shown in Equation (1):

$$\gamma_1 = \frac{\mu_2^{1.5}}{\mu_3} \tag{1}$$

wherein $\mu_2$ is the second central moment and $\mu_3$ is the second central moment. $\mu_2$ and $\mu_3$ are calculated from the i-th (normalized) raw moments $\mu_i'$ as shown in Equations (2), (3), and (4):

$$\mu_i' = \frac{\int x^i P(x) dx}{\int P(x) dx} \tag{2}$$

$$\mu_2 = -\mu_1'^2 + \mu_2' \tag{3}$$

$$\mu_3 = 2\mu_1'^3 - 3\mu_1'\mu_2' + \mu_3' \tag{4}$$

Accordingly, from the HT-GPC curve for distilled polyethylene wax #1 shown in the Figure:
central moment $\mu_1$=890
central moment $\mu_2$=856
central moment $\mu_3$=−4122
raw moment $\mu_1'$=890
raw moment $\mu_2'$=7.93E+05
raw moment $\mu_3'$=7.08E+08
standard deviation σ=29.2
skewness $\gamma_1$=−0.165

From the HT-GPC curve for distilled polyethylene wax #2 shown in the Figure:
central moment $\mu_1$=888
central moment $\mu_2$=681
central moment $\mu_3$=−4536
raw moment $\mu_1'$=888
raw moment $\mu_2'$=7.9E+05
raw moment $\mu_3'$=7.03E+08
standard deviation σ=26.1
skewness $\gamma_1$=−0.255

The polyethylene wax material selected for the inks disclosed herein is a mixture of molecules wherein the distribution of molecular weights is asymmetrical and skewed toward the high molecular weight end. For purposes of the polyethylene waxes and the inks disclosed herein, the term "skewed toward" is defined to mean that, regardless of the method used to measure molecular weight, a curve which plots relative amounts of molecules with different molecular weights on the "y" axis (ordinate) versus either molecular weight directly or some other value either directly or inversely proportional to molecular weight on the "x" axis (abscissa) will be a bell-shaped curve having a trailing tail in the direction of lower molecular weight values and a relatively sharp drop in the direction of higher molecular weight values. Accordingly, when the method used to measure molecular weight is high temperature gel permeation chromatography (HT-GPC) and the abscissa unit of measurement is retention time (which is inversely proportional to molecular weight), the bell-shaped curve has a trailing tail on the left and a relatively sharp drop on the right, has a negative skew value, and is skewed toward the direction of higher molecular weight (since molecular weight is inversely proportional to retention time). When relative amounts of molecules with different molecular weights are plotted directly against molecular weight on the "x" axis (abscissa) with molecular weight values increasing left to right along the abscissa, the bell-shaped curve has a trailing tail on the right and a relatively sharp drop on the left, has a positive skew value, and is also skewed toward the direction of higher molecular weight.

In specific embodiments, the polyethylene wax material, after having had the low molecular weight fraction removed therefrom, when tested by high temperature gel permeation chromatography, will generate a curve, which shows the relative amount of eluted polyethylene of a given molecular weight at the end of the column, as expressed by the signal intensity detected by a refractive index detector versus retention time (in seconds), having a negative skew with an absolute value of in one embodiment at least about 0.05, in another embodiment at least about 0.075, and in yet another embodiment at least about 0.1, and in one embodiment no more than about 0.8, in another embodiment no more than about 0.7, and in yet another embodiment no more than about 0.6, although the skew value for this curve can be outside of these ranges.

The polyethylene wax is present in the ink in any desired or effective amount, in one embodiment at least about 10 percent by weight of the phase change ink carrier, in another embodiment at least about 15 percent by weight of carrier, and in yet another embodiment at least about 20 percent by weight of the carrier, and in one embodiment no more than about 95 percent by weight of the carrier, in another embodiment no more than about 90 percent by weight of the carrier, and in yet another embodiment no more than about 85 percent by weight of the carrier, although the amount can be outside of these ranges.

Additional examples of suitable phase change ink carrier materials are monoamides, tetra-amides, mixtures thereof, and the like. Specific examples of suitable fatty amide ink carrier materials include stearyl stearamide, such as KEMAMIDE S-180, available from Crompton Corporation, Greenwich, Conn., and the like. Further information on fatty amide carrier materials is disclosed in, for example, U.S. Pat. Nos. 4,889,560, 4,889,761, 5,194,638, 4,830,671, 6,174,937, 5,372,852, 5,597,856, 6,174,937, and British Patent GB 2 238 792, the disclosures of each of which are totally incorporated herein by reference. In one specific embodiment, a monoamide is present in the ink carrier in an amount in one embodiment of at least about 0.01 percent by weight of the carrier, in another embodiment of at least 2 percent by weight of the carrier, and in yet another embodiment of at least about 5 percent by weight of the carrier, and in one embodiment of no more than about 90 percent by weight of the carrier, in another embodiment of no more than about 80 percent by weight of the carrier, and in yet another embodiment of no more than about 70 percent by weight of the carrier, although the amount can be outside of these ranges.

Also suitable as phase change ink carrier materials are isocyanate-derived resins and waxes, such as urethane isocyanate-derived materials, urea isocyanate-derived materials, urethane/urea isocyanate-derived materials, mixtures thereof, and the like. Further information on isocyanate-derived carrier materials is disclosed in, for example, U.S. Pat. Nos. 5,750,604, 5,780,528, 5,782,966, 5,783,658, 5,827,918, 5,830,942, 5,919,839, 6,255,432, 6,309,453, British Patent GB 2 294 939, British Patent GB 2 305 928, British Patent GB 2 305 670, British Patent GB 2 290 793, PCT Publication WO 94/14902, PCT Publication WO 97/12003, PCT Publication WO 97/13816, PCT Publication WO 96/14364, PCT Publication WO 97/33943, and PCT Publication WO 95/04760, the disclosures of each of which are totally incorporated herein by reference.

In one specific embodiment, the ink can contain a urethane resin obtained from the reaction of two equivalents of ABITOL® E hydroabietyl alcohol (available from Hercules Inc., Wilmington, Del.) and one equivalent of isophorone diisocyanate, prepared as described in Example 1 of U.S. Pat. No. 5,782,966, the disclosure of which is totally incorporated herein by reference. When present, this resin is present in the ink in one embodiment in an amount of at least about 1 percent by weight of the ink carrier, in another embodiment at least about 2 percent by weight of the ink carrier, in yet another embodiment at least about 3 percent by weight of the ink carrier, in another embodiment at least about 4 percent by weight of the ink carrier, and in yet another embodiment at least about 5 percent by weight of the ink carrier, and in one embodiment no more than about 80 percent by weight of the ink carrier, in another embodiment no more than about 70 percent by weight of the ink carrier, and in yet another embodiment no more than about 60 percent by weight of the ink carrier, although the amount can be outside of these ranges. (0051) In another specific embodiment, the ink can contain a urethane resin that is the adduct of three equivalents of stearyl isocyanate and a glycerol-based alcohol prepared as described in Example 4 of U.S. Pat. No. 6,309,453, the disclosure of which is totally incorporated herein by reference. When present, this resin is present in the ink in one embodiment in an amount of at least about 0.5 percent by weight of the ink carrier, in another embodiment at least about 1 percent by weight of the ink carrier, and in yet another embodiment at least about 2 percent by weight of the ink carrier, and in one embodiment no more than about 40 percent by weight of the ink carrier, in another embodiment no more than about 35 percent by weight of the ink carrier, and in yet another embodiment no more than about 30 percent by weight of the ink carrier, although the amount can be outside of these ranges.

The ink carrier is present in the phase change ink in any desired or effective amount, in one embodiment of at least about 0.1 percent by weight of the ink, in another embodiment of at least about 50 percent by weight of the ink, and in yet another embodiment of at least about 90 percent by weight of the ink, and in one embodiment of no more than about 99 percent by weight of the ink, in another embodiment of no more than about 98 percent by weight of the ink, and in yet another embodiment of no more than about 95 percent by weight of the ink, although the amount can be outside of these ranges.

The phase change ink compositions also contain a colorant. The phase change carrier compositions can be used in combination with phase change ink colorant materials such as Color Index (C.I.) Solvent Dyes, Disperse Dyes, modified Acid and Direct Dyes, Basic Dyes, Sulphur Dyes, Vat Dyes, and the like. Examples of suitable dyes include Neozapon Red 492 (BASF); Orasol Red G (Ciba-Geigy); Direct Brilliant Pink B (Crompton & Knowles); Aizen Spilon Red C-BH (Hodogaya Chemical); Kayanol Red 3BL (Nippon Kayaku); Levanol Brilliant Red 3BW (Mobay Chemical); Levaderm Lemon Yellow (Mobay Chemical); Spirit Fast Yellow 3G; Aizen Spilon Yellow C-GNH (Hodogaya Chemical); Sirius Supra Yellow GD 167; Cartasol Brilliant Yellow 4GF (Sandoz); Pergasol Yellow CGP (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc. A (Morton-Thiokol); Diaazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF), Neozapon Black X51 (C.I. Solvent Black, C.I. 12195) (BASF), Sudan Blue 670 (C.I. 61554) (BASF), Sudan Yellow 146 (C.I. 12700) (BASF), Sudan Red 462 (C.I. 26050) (BASF), Intratherm Yellow 346 from Crompton and Knowles, C.I. Disperse Yellow 238, Neptune Red Base NB543 (BASF, C.I. Solvent Red 49), Neopen Blue FF-4012 from BASF, Lampronol Black BR from ICI (C.I. Solvent Black 35), Morton Morplas Magenta 36 (C.I. Solvent Red 172), metal phthalocyanine colorants such as those disclosed in U.S. Pat. No. 6,221,137, the disclosure of which is totally incorporated herein by reference, and the like. Polymeric dyes can also be used, such as those disclosed in, for example, U.S. Pat. Nos. 5,621,022 and 5,231,135, the disclosures of each of which are totally incorporated herein by reference, and commercially available from, for example, Milliken & Company as Milliken Ink Yellow 12, Milliken Ink Blue 92, Milliken Ink Red 357, Milliken Ink Yellow 1800, Milliken Ink Black 8915-67, uncut Reactant Orange X-38, uncut Reactant Blue X-17, Solvent Yellow 162, Acid Red 52, Solvent Blue 44, and uncut Reactant Violet X-80.

Also suitable are colorants of the formula

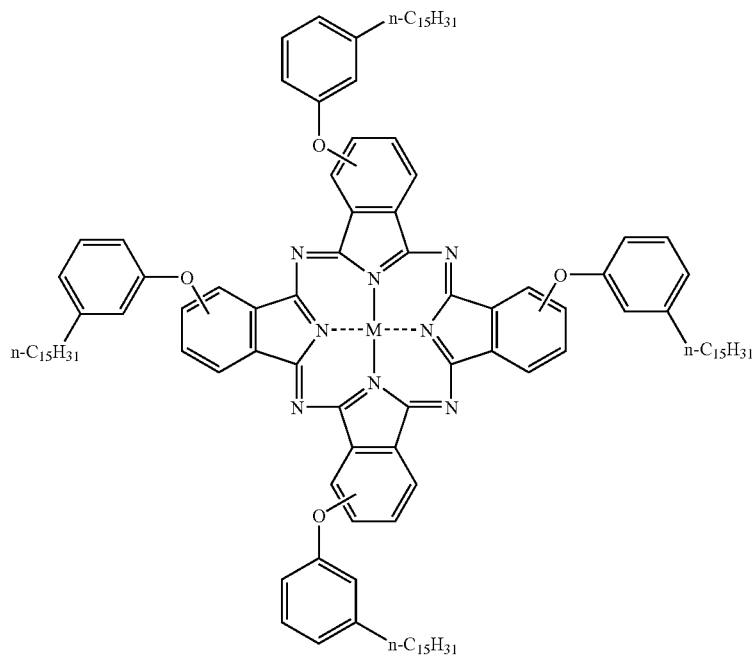

wherein M atom or group of atoms capable of bonding to the central cavity phthalocyanine molecule, wherein axial ligands optionally can be attached to M, as disclosed in U.S. Pat. Nos. 6,472,523, 6,726,755, and 6,476,219, the disclosures of each of which are totally incorporated herein by reference, colorants of the formula

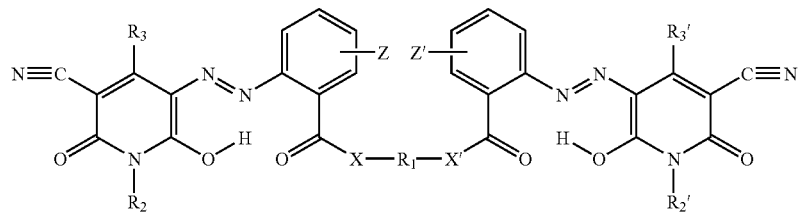

wherein (A) R₁ is (i) an alkylene group, (ii) an arylene group, (iii) an arylalkylene group, (iv) an alkylarylene group, (v) an alkyleneoxy group, (vi) an aryleneoxy group, (vii) an arylalkyleneoxy group, (viii) an alkylaryleneoxy group, (ix) a polyalkyleneoxy group, (x) a polyaryleneoxy group, (xi) a polyarylalkyleneoxy group, (xii) a polyalkylaryleneoxy group, (xiii) a heterocyclic group, (xiv) a silylene group, (xv) a siloxane group, (xvi) a polysilylene group, or (xvii) a polysiloxane group, (B) R₂ and R₂' each, independently of the other, is (i) an alkyl group, (ii) an aryl group, (iii) an arylalkyl group, (iv) an alkylaryl group, (v) an alkoxy group, (vi) an aryloxy group, (vii) an arylalkyloxy group, (viii) an alkylaryloxy group, (ix) a polyalkyleneoxy group, (x) a polyaryleneoxy group, (xi) a polyarylalkyleneoxy group, (xii) a polyalkylaryleneoxy group, (xiii) a heterocyclic group, (xiv) a silyl group, (xv) a siloxane group, (xvi) a polysilylene group, (xvii) a polysiloxane group, or (xviii) a group of the formula

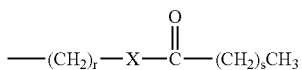

wherein r and s are each, independently of the other, integers representing a number of repeat —CH₂— groups, (C) R₃ and R₃' each, independently of the other, is (i) an alkyl group, (ii) an aryl group, (iii) an arylalkyl group, or (iv) an alkylaryl group, (D) X and X' each, independently of the other, is (i) a direct bond, (ii) an oxygen atom, (iii) a sulfur atom, (iv) a group of the formula —NR₄₀— wherein R₄₀ is a hydrogen atom, an alkyl group, an aryl group, an arylalkyl group, or an alkylaryl group, or (v) a group of the formula —CR₅₀R₆₀— wherein R₅₀ and R₆₀ each, independently of the other, is a hydrogen atom, an alkyl group, an aryl group, an arylalkyl group, or an alkylaryl group, and (E) Z and Z' each, independently of the other, is (i) a hydrogen atom, (ii) a halogen atom, (iii) a nitro group, (iv) an alkyl group, (v) an aryl group, (vi) an arylalkyl group, (vii) an alkylaryl group, (viii) a group of the formula

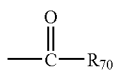

wherein R₇₀ is an alkyl group, an aryl group, an arylalkyl group, an alkylaryl group, an alkoxy group, an aryloxy group, an arylalkyloxy group, an alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group, (ix) a sulfonyl group of the formula —SO₂R₈₀ wherein R₈₀ is a hydrogen atom, an alkyl group, an aryl group, an arylalkyl group, an alkylaryl group, an alkoxy group, an aryloxy group, an arylalkyloxy group, an alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group, or (x) a phosphoryl group of the formula —PO₃R₉₀ wherein R₉₀ is a hydrogen atom, an alkyl group, an aryl group, an arylalkyl group, an alkylaryl group, an alkoxy group, an aryloxy group, an arylalkyloxy group, an alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group, as disclosed in U.S. Pat. Nos. 6,576,747, 6,713,614, 6,663,703, and 6,576,748, the disclosures of which are totally incorporated herein by reference, colorants of the formula

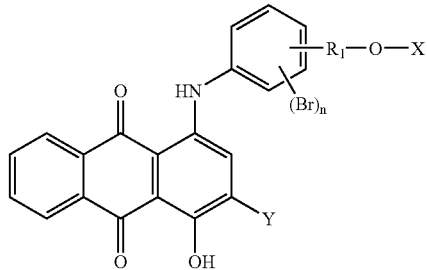

wherein Y is a hydrogen atom or a bromine atom, n is an integer of 0, 1, 2, 3, or 4, R₁ is an alkylene group or an arylalkylene group, and X is (a) a hydrogen atom, (b) a group of the formula

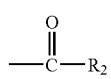

wherein R₂ is an alkyl group, an aryl group, an arylalkyl group, or an alkylaryl group, (c) an alkyleneoxy, aryleneoxy, arylalkyleneoxy, or alkylaryleneoxy group, or (d) a group of the formula

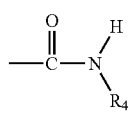

wherein R₄ is an alkyl group, an aryl group, an arylalkyl group, or an alkylaryl group, as disclosed in U.S. Pat. Nos. 6,958,406, 6,821,327, and Copending Application U.S. Ser. No. 10/260,379, filed Sep. 27, 2002, entitled "Methods for Making Colorant Compounds," the disclosures of each of which are totally incorporated herein by reference, colorants of the formula

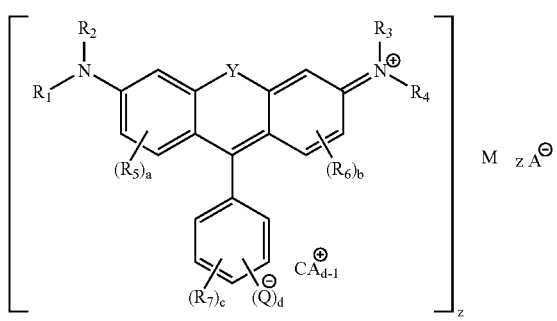

wherein M is either (1) a metal ion having a positive charge of +y wherein y is an integer which is at least 2, said metal ion being capable of forming a compound with at least two

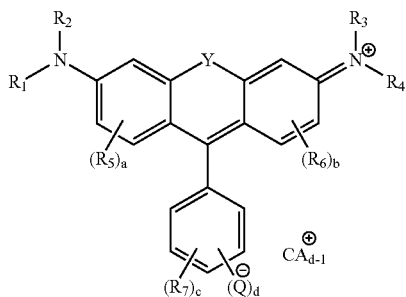

chromogen moieties, or (2) a metal-containing moiety capable of forming a compound with at least two

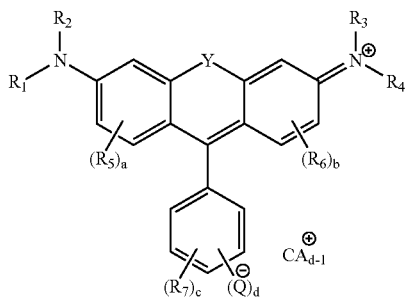

chromogen moieties, z is an integer representing the number of

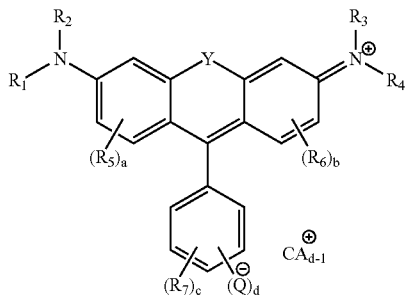

chromogen moieties associated with the metal and is at least 2, $R_1$, $R_2$, $R_3$, and $R_4$ each, independently of the others, is (i) a hydrogen atom, (ii) an alkyl group, (iii) an aryl group, (iv) an arylalkyl group, or (v) an alkylaryl group, wherein $R_1$ and $R_2$ can be joined together to form a ring, wherein $R_3$ and $R_4$ can be joined together to form a ring, and wherein $R_1$, $R_2$, $R_3$, and $R_4$ can each be joined to a phenyl ring in the central structure, a and b each, independently of the others, is an integer which is 0, 1, 2, or 3, c is an integer which is 0, 1, 2, 3, or 4, each $R_5$, $R_6$, and $R_7$, independently of the others, is (i) an alkyl group, (ii) an aryl group, (iii) an arylalkyl group, (iv) an alkylaryl group, (v) a halogen atom, (vi) an ester group, (vii) an amide group, (viii) a sulfone group, (ix) an amine group or ammonium group, (x) a nitrile group, (xi) a nitro group, (xii) a hydroxy group, (xiii) a cyano group, (xiv) a pyridine or pyridinium group, (xv) an ether group, (xvi) an aldehyde group, (xvii) a ketone group, (xviii) a carbonyl group, (xix) a thiocarbonyl group, (xx) a sulfate group, (xxi) a sulfide group, (xxii) a sulfoxide group, (xxiii) a phosphine or phosphonium group, (xxiv) a phosphate group, (xxv) a mercapto group, (xxvi) a nitroso group, (xxvii) an acyl group, (xxviii) an acid anhydride group, (xxix) an azide group, (xxx) an azo group, (xxxi) a cyanato group, (xxxii) an isocyanato group, (xxxiii) a thiocyanato group, (xxxiv) an isothiocyanato group, (xxxv) a urethane group, or (xxxvi) a urea group, wherein $R_5$, $R_6$, and $R_7$ can each be joined to a phenyl ring in the central structure,

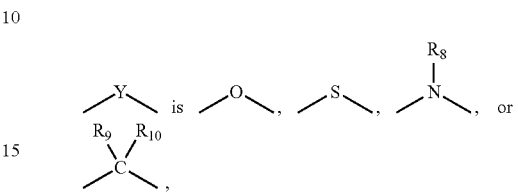

$R_8$, $R_9$, and $R_{10}$ each, independently of the others, is (i) a hydrogen atom, (ii) an alkyl group, (iii) an aryl group, (iv) an arylalkyl group, or (v) an alkylaryl group, provided that the number of carbon atoms in $R_1+R_2+R_3+R_4+R_5+R_6+R_7+R_8+R_9+R_{10}$ is at least about 16, Q- is a COO- group or a $SO_3$— group, d is an integer which is 1, 2, 3, 4, or 5, A is an anion, and CA is either a hydrogen atom or a cation associated with all but one of the Q- groups, as disclosed in U.S. Pat. No. 6,835, 238, Copending Application U.S. Ser. No. 10/607,373, filed Jun. 26, 2003, entitled "Colorant Compounds,"Copending Application U.S. Ser. No. 10/898,724, filed Jul. 23, 2004, entitled "Processes for Preparing Phase Change Inks," Copending Application U.S. Ser. No. 10/898,028, entitled "Colorant Compounds," and Copending Application U.S. Ser. No. 10/898,432, entitled "Phase Change Inks," the disclosures of each of which are totally incorporated herein by reference, and colorants as disclosed in U.S. Pat. Nos. 6,472, 523, 6,726,755, 6,476,219, 6,663,703, 6,755,902, 6,590,082, 6,696,552, 6,576,748, 6,646,111, and 6,673,139, the disclosures of each of which are totally incorporated herein by reference.

Other ink colors besides the subtractive primary colors can be desirable for applications such as postal marking, industrial marking, and labelling using phase change printing, and the inks are applicable to these needs. Further, infrared (IR) or ultraviolet (UV) absorbing dyes can also be incorporated into the inks for use in applications such as "invisible" coding or marking.of products. Examples of such infrared and ultraviolet absorbing dyes are disclosed in, for example, U.S. Pat. Nos. 5,378,574, 5,146,087, 5,145,518, 5,543,177, 5,225,900, 5,301,044, 5,286,286, 5,275,647, 5,208,630, 5,202,265, 5,271,764, 5,256,193, 5,385,803, and 5,554,480, the disclosures of each of which are totally incorporated herein by reference.

In a specific embodiment, the colorant is an isocyanate-derived colored resin as disclosed in, for example, U.S. Pat. Nos. 5,780,528 and 5,919,839, the disclosures of each of which are totally incorporated herein by reference. In this embodiment, the colorant is the reaction product of a hydroxyl-substituted or primary or secondary amino-substituted chromophore with an isocyanate. Examples of suitable isocyanates include monoisocyanates, diisocyanates, triisocyanates, copolymers of a diisocyanate, copolymers of a triisocyanate, polyisocyanates (having more than three isocyanate functional groups), and the like, as well as mixtures thereof. Specific examples of suitable isocyanates include those listed hereinabove as being suitable for reaction with the hydroxyl-substituted or amino-substituted antioxidant.

Examples of suitable hydroxyl-substituted and primary or secondary amino-substituted chromophores include those disclosed in, for example, U.S. Pat. Nos. 3,157,633, 3,927,044, 3,994,835, 4,102,644, 4,113,721, 4,132,840, 4,137,243, 4,170,564, 4,284,729, 4,507,407, 4,640,690, 4,732,570, 4,751,254, 4,751,254, 4,761,502, 4,775,748, 4,812,141, 4,846,846, 4,871,371, 4,912,203, 4,978,362, 5,043,01.3, 5,059,244, 5,149,800, 5,177,200, 5,270,363, 5,290,921, 5,731,398, the disclosures of each of which are totally incorporated herein by reference. Hydroxyl-containing and primary or secondary amino-containing colorants from the classes of Color Index (C.I.) Solvent Dyes, Disperse Dyes, modified Acid and Direct Dyes, Basic Dyes, Sulphur Dyes, Vat Dyes, and the like can also be used.

The colorant is present in the phase change ink in any desired or effective amount to obtain the desired color or hue, in one embodiment at least about 0.1 percent by weight of the ink, in another embodiment at least about 0.2 percent by weight of the ink, and in yet another embodiment at least about 0.5 percent by weight of the ink, and in one embodiment no more than about 50 percent by weight of the ink, in another embodiment no more than about 20 percent by weight of the ink, and in yet another embodiment no more than about 10 percent by weight of the ink, although the amount can be outside of these ranges.

The inks can also optionally contain an antioxidant. The optional antioxidants of the ink compositions protect the images from oxidation and also protect the ink components from oxidation during the heating portion of the ink preparation process. Specific examples of suitable antioxidants include NAUGUARD® 524, NAUGUARD® 76, and NAUGUARD® 512 (commercially available from Uniroyal Chemical Company, Oxford, Conn.), IRGANOX® 1010 (commercially available from Ciba Geigy), and the like. When present, the optional antioxidant is present in the ink in any desired or effective amount, in one embodiment of at least about 0.01 percent by weight of the ink, in another embodiment of at least about 0.05 percent by weight of the ink, and in yet another embodiment of at least about 0.1 percent by weight of the ink, and in one embodiment of no more than about 20 percent by weight of the ink, in another embodiment of no more than about 5 percent by weight of the ink, and in yet another embodiment of no more than about 3 percent by weight of the ink, although the amount can be outside of these ranges.

Other optional additives to the inks include clarifiers, such as UNION CAMP® X37-523-235 (commercially available from Union Camp), in an amount in one embodiment of at least about 0.01 percent by weight of the ink, in another embodiment of at least about 0.1 percent by weight of the ink, and in yet another embodiment of at least about 5 percent by weight of the ink, and in one embodiment of no more than about 98 percent by weight of the ink, in another embodiment of no more than about 50 percent by weight of the ink, and in yet another embodiment of no more than about 10 percent by weight of the ink, although the amount can be outside of these ranges, tackifiers, such as FORAL® 85, a glycerol ester of hydrogenated abietic (rosin) acid (commercially available from Hercules), FORAL® 105, a pentaerythritol ester of hydroabietic (rosin) acid (commercially available from Hercules), CELLOLYN® 21, a hydroabietic (rosin) alcohol ester of phthalic acid (commercially available from Hercules), ARAKAWA KE-311 and KE-100 Resins, triglycerides of hydrogenated abietic (rosin) acid (commercially available from Arakawa Chemical Industries, Ltd.), synthetic polyterpene resins such as NEVTAC® 2300, NEVTAC® 100, and NEVTAC® 80 (commercially available from Neville Chemical Company), WINGTACK® 86, a modified synthetic polyterpene resin (commercially available from Goodyear), and the like, in an amount in one embodiment of at least about 0.1 percent by weight of the ink, in another embodiment of at least about 5 percent by weight of the ink, and in yet another embodiment of at least about 10 percent by weight of the ink, and in one embodiment of no more than about 98 percent by weight of the ink, in another embodiment of no more than about 75 percent by weight of the ink, and in yet another embodiment of no more than about 50 percent by weight of the ink, although the amount can be outside of these ranges, adhesives, such as VERSAMID® 757, 759, or 744 (commercially available from Henkel), in an amount in one embodiment of at least about 0.1 percent by weight of the ink, in another embodiment of at least about 1 percent by weight of the ink, and in yet another embodiment of at least about 5 percent by weight of the ink and in one embodiment of no more than about 98 percent by weight of the ink, in another embodiment of no more than about 50 percent by weight of the ink, and in yet another embodiment of no more than about 10 percent by weight of the ink, although the amount can be outside of these ranges, plasticizers, such as UNIPLEX® 250 (commercially available from Uniplex), the phthalate ester plasticizers commercially available from Monsanto under the trade name SANTICIZER®, such as dioctyl phthalate, diundecyl phthalate, alkylbenzyl phthalate (SANTICIZER® 278), triphenyl phosphate (commercially available from Monsanto), KP-140®, a tributoxyethyl phosphate (commercially available from FMC Corporation), MORFLEX® 150, a dicyclohexyl phthalate (commercially available from Morflex Chemical Company Inc.), trioctyl trimellitate (commercially available from Eastman Kodak Co.), and the like, in an amount in one embodiment of at least about 0.1 percent by weight of the ink, in another embodiment of at least about 1 percent by weight of the ink, and in yet another embodiment of at least about 2 percent by weight of the ink, and in one embodiment of no more than about 50 percent by weight of the ink, in another embodiment of no more than about 30 percent by weight of the ink, and in yet another embodiment of no more than about 10 percent by weight of the ink, although the amount can be outside of these ranges, and the like.

The ink compositions in one embodiment have peak melting points of no lower than about 50° C., in another embodiment of no lower than about 60° C., and in yet another embodiment of no lower than about 70° C., and have melting points in one embodiment of no higher than about 160° C., in another embodiment of no higher than about 140° C., and in yet another embodiment of no higher than about 100° C., although the peak melting point can be outside of these ranges.

The ink compositions generally have melt viscosities at the jetting temperature (in one embodiment no lower than about 75° C., in another embodiment no lower than about 85° C., and in yet another embodiment no lower than about 95° C., and in one embodiment no higher than about 150° C., and in another embodiment no higher than about 120° C., although the jetting temperature can be outside of these ranges) in one embodiment of no more than about 30 centipoise, in another embodiment of no more than about 20 centipoise, and in yet another embodiment of no more than about 15 centipoise, and in one embodiment of no less than about 2 centipoise, in another embodiment of no less than about 5 centipoise, and in yet another embodiment of no less than about 7 centipoise, although the melt viscosity can be outside of these ranges. In another specific embodiment, the inks have viscosities of from about 7 to about 15 centipoise at temperatures of about 110, 115, and/or 120° C.

The ink compositions can be prepared by any desired or suitable method. For example, the ink ingredients can be mixed together, followed by heating, to a temperature in one embodiment of at least about 100° C., and in one embodiment of no more than about 140° C., although the temperature can be outside of these ranges, and stirring until a homogeneous ink composition is obtained, followed by cooling the ink to ambient temperature (typically from about 20 to about 25° C.). The inks are solid at ambient temperature. In a specific embodiment, during the formation process, the inks in their molten state are poured into molds and then allowed to cool and solidify to form ink sticks.

The inks can be employed in apparatus for direct printing ink jet processes and in indirect (offset) printing ink jet applications. Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. In another specific embodiment, both the intermediate transfer member and the final recording sheet are heated; in this embodiment, both the intermediate transfer member and the final recording sheet are heated to a temperature below that of the melted ink in the printing apparatus; in this embodiment, the relative temperatures of the intermediate transfer member and the final recording sheet can be (1) the intermediate transfer member is heated to a temperature above that of the final recording substrate and below that of the melted ink in the printing apparatus; (2) the final recording substrate is heated to a temperature above that of the intermediate transfer member and below that of the melted ink in the printing apparatus; or (3) the intermediate transfer member and the final recording sheet are heated to approximately the same temperature. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, and the like. Phase change inks as disclosed herein can also be used in printing processes other than hot melt ink jet printing processes.

Any suitable substrate or recording sheet can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, HAMMERMILL LASERPRINT® paper, and the like, transparency materials, fabrics, textile products, plastics, polymeric films, inorganic substrates such as metals and wood, and the like.

Specific embodiments will now be described in detail. These examples are intended to be illustrative, and the claims are not limited to the materials, conditions, or process parameters set forth in these embodiments. All parts and percentages are by weight unless otherwise indicated.

EXAMPLE I

Ink compositions were prepared by the following process. All ink ingredients except colorant(s) were charged into a stainless steel beaker. The resulting mixture was then melted together at a temperature of about 110° C. in an oven, followed by blending by stirring in a temperature controlled mantle at about 110° C. for about 0.3 hour. To this mixture was then added the colorant(s). After stirring for about 2 additional hours, the ink thus formed was filtered through a heated MOTT® apparatus (obtained from Mott Metallurgical) using Whatman #3 filter paper under a pressure of about 15 pounds per square inch. The filtered phase change ink thus formed was poured into molds and allowed to solidify to form ink sticks. Inks were prepared from the following ingredients: polyethylene wax, $M_p$=572, $M_n$=516, $M_w$=570, MWD=1.10 as measured by HT-GPC (PE500, obtained from Baker Petrolite, Tulsa, Okla.); polyethylene wax, distilled to remove about 10 percent of the lower molecular weight fraction, $M_p$=582, $M_n$=574, $M_w$=613, MWD=1.07 as measured by HT-GPC (obtained from Baker Petrolite, Tulsa, Okla.); a branched triamide of the formula

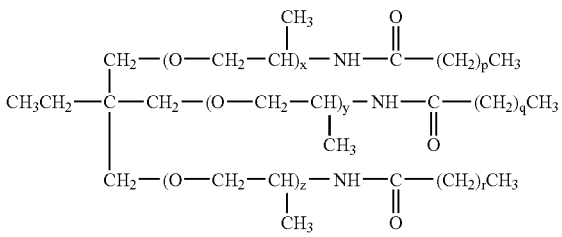

wherein p, q, and r each have an average value of about 35, prepared as described in Example II of U.S. Pat. No. 6,860,930, the disclosure of which is totally incorporated herein by reference; stearyl stearamide wax (KEMAMIDE® S-180, obtained from Crompton Corporation, Greenwich, Conn.); KE-100 Resin (triglycerides of hydrogenated abietic (rosin) acid, obtained from Arakawa Chemical Industries (USA) Inc., Chicago, Ill.); a urethane resin that was the adduct of three equivalents of stearyl isocyanate and a glycerol-based alcohol, prepared as described in Example 4 of U.S. Pat. No. 6,309,453, the disclosure of which is totally incorporated herein by reference; NAUGUARD® 445 antioxidant (obtained from Uniroyal Chemical Co., Middlebury, Conn.); a cyan colorant as disclosed in Examples V through XI of U.S. Pat. No. 6,472,523, the disclosure of which is totally incorporated herein by reference; a yellow colorant as described in Examples I, II, and IV of U.S. Pat. No. 6,713,614, the disclosure of which is totally incorporated herein by reference; a magenta colorant prepared as disclosed in Example I, Part E of U.S. Pat. No. 6,821,327, the disclosure of which is totally incorporated herein by reference (hereinafter referred to as magenta # 1); a magenta colorant as described in Example I of U.S. Pat. No. 6,835,238, the disclosure of which is totally incorporated herein by reference (hereinafter referred to as magenta #2; zinc chloride; and dodecyl benzene sulfuric acid (DDBSA, Bio-soft S-100, obtained from Stepan Company, Elwood, Ill. The amounts in percent by weight of the ink of each ingredient are listed in the table below for each ink:

| | Ink | | | | | | | | |
|---|---|---|---|---|---|---|---|---|---|
| | A | B | 1 | 2 | 3 | 4 | 5 | 6 | 7 |
| PE 500 | 50.00 | 51.87 | 0 | 0 | 0 | 0 | 0 | 0 | 0 |
| distilled wax | 0 | 0 | 52.91 | 52.91 | 53.3 | 58.04 | 53.92 | 53.9 | 58.00 |
| triamide | 13.95 | 13.06 | 15.32 | 12.32 | 12.4 | 10.49 | 12.16 | 12.72 | 11.00 |
| S-180 | 15.14 | 14.85 | 15.14 | 15.14 | 15.24 | 12.87 | 14.9 | 15.4 | 12.8 |
| KE-100 | 12.42 | 11.23 | 7.96 | 10.96 | 11.1 | 9.3 | 10.78 | 11.3 | 10 |
| urethane | 4.42 | 4.34 | 4.42 | 4.42 | 4.44 | 3.76 | 4.33 | 4.5 | 3.76 |
| DDBSA | 0.35 | 0 | 0.27 | 0.27 | 0 | 0 | 0.25 | 0 | 0 |
| N-445 | 0.17 | 0.17 | 0.17 | 0.17 | 0.18 | 0.14 | 0.17 | 0.18 | 0.17 |
| cyan colorant | 3.55 | 0 | 3.81 | 3.81 | 0 | 0 | 3.48 | 0 | 0 |
| yellow colorant | 0 | 0 | 0 | 0 | 3.34 | 0 | 0 | 2 | 0 |
| magenta #1 | 0 | 2.32 | 0 | 0 | 0 | 3.04 | 0 | 0 | 2.10 |
| magenta #2 | 0 | 1.87 | 0 | 0 | 0 | 1.65 | 0 | 0 | 1.90 |
| $ZnCl_2$ | 0 | 0.3 | 0 | 0 | 0 | 0.7 | 0 | 0 | 0.27 |

Inks A and B are provided for comparative purposes.

Ink Characteristics

Various characteristics of the inks were measured and are indicated in the table below. Viscosity ($\eta$, centipoise) was measured DSR-2000 cone-plate rheometer at 110° C. The spectral strength was determined using a spectrophotographic procedure based on the measurement of the ink absorption in solution by dissolving the cyan and yellow inks in toluene and the magenta ink in n-butanol and measuring the absorbance using a Perkin Elmer Lambda 2S UV/VIS spectrophotometer. Glass transition temperature ($T_g$) was measured by Dynamic Mechanic Analysis using a Rheometrics Solid Analyzer (RSA II). Peak melting point (MP) was measured by differential scanning calorimetry (DSC) using a DUPONT 2100 calorimeter.

As the data indicate, the melting points of these inks are about 80° C. and the viscosities of most of them are close to about 10.6 at 110° C., indicating that they are suitable for jetting at temperatures of from about 105 to about 115° C. The spectral strengths confirm good dissolution of the cyan, magenta, and yellow colorants. Color space data for some of the inks printed on HAMMERMILL paper with a K-Printing Proofer (manufactured by RK Print Coat Instruments, Royston, UK) were obtained on an ACS® Spectro Sensor® II Colorimeter (obtained from Applied Color Systems Inc.) in accordance with the measuring methods stipulated in ASTM 1E805 (Standard Practice of Instrumental Methods of Color or Color Difference Measurements of Materials) using the appropriate calibration standards supplied by the instrument manufacturer. For purposes of verifying and quantifying the overall calorimetric performance of the inks, measurement data were reduced, via tristimulus integration, following ASTM E308 (Standard Method for Computing the Colors of Objects using the CIE System) in order to calculate the 1976 CIE L* (Lightness), a* (redness-greenness), and b* (yellowness-blueness) CIELAB values for each phase change ink sample. The results are as follows:

| | Ink | | | | | |
|---|---|---|---|---|---|---|
| | 2 | 3 | 4 | 5 | 6 | 7 |
| L* | 64.16 | 91.08 | 56.20 | 65.59 | 92.13 | 63.51 |
| a* | −43.60 | 2.75 | 69.63 | −43.76 | 0.30 | 61.40 |
| b* | −26.82 | 95.23 | −32.55 | −27.06 | 87.70 | −32.58 |
| C* | 51.19 | 95.27 | 76.86 | 51.45 | 87.70 | 69.51 |
| h* | 211.60 | 88.35 | 334.94 | 211.73 | 89.80 | 332.05 |

— = not measured or calculated

Ink Color Stability

Inks 2, 3, and 4 were heated in oven at 110° C. and sampled at different time intervals. This temperature is comparable to the temperature at which these inks can be jetted in a phase change ink jet printer. The sampled inks were printed with a K-Proofer at 150° C., and the color changes of the resultant prints attributable to the oven heating were determined as a function of the time heated. As can be seen in the table below, heating did not cause much color change, as evidenced by extremely low delta E values, demonstrating the advantage of the lower printer operating temperature.

| | Ink | | | | | | | | |
|---|---|---|---|---|---|---|---|---|---|
| | A | B | 1 | 2 | 3 | 4 | 5 | 6 | 7 |
| $\eta$ | 10.5 | 10.62 | 10.74 | 10.62 | 10.85 | 11.09 | 10.97 | 10.74 | 10.85 |
| SS | 4469 | — | 4852 | 4790 | 1692 | 940 | 4212 | 1025 | 717 |
| $T_g$ | — | 12.9 | 11.36 | 10.77 | 11.57 | 9.63 | 11.48 | 12.04 | 11.2 |
| MP | — | 80.5, 93.0 | 83.5 | 82.9 | 82.6 | 81.1 | 82.9 | 83.3 | 82 |

— = not measured or calculated

| | Ink | | |
|---|---|---|---|
| | 2 | 3 | 4 |
| 0 days | 0.0 | 0.0 | 0.0 |
| 3 days | 1.0 | 0.7 | 1.1 |
| 6 days | 1.7 | 1.2 | 1.3 |
| 10 days | 2.7 | 1.7 | 2.2 |
| 14 days | 3.6 | 1.9 | 2.0 |

Print Performance

Inks 1 through 7 were all jetted successfully at 110° C. in a XEROX® PHASER® 8400. Ink 2 was tested extensively for jetting and transfixing performance by incorporating it into a XEROX® PHASER® 8400 modified to print at 110° C. and comparing its performance to the cyan ink commercially supplied for printing with the XEROX® PHASER® 8400 at the standard printing temperature. The results are summarized in the table below. In the table, + indicates performance superior to the commercial ink, O indicates performance the same as the commercial ink, and − indicates performance inferior to the commercial ink.

| | |
|---|---|
| dither dropout | o |
| solid field dropout | − |
| paper durability gouge (%) | o |
| paper durability fold (mils) | o |
| surface finish (gloss) | o |
| blocking | o |

Dropout refers to the efficiency of ink transfer from the print engine to the final recording sheet. When dropout is very bad, part of the image is missing from the print (i.e., the pixels are not transferred from the intermediate transfer member to the final recording sheet). Dither dropout refers to a transfer failure when printing dithered images (for example, 30 percent to 70 percent coverage) and on rough recording sheets. Solid dropout refers to a transfer failure when printing a solid fill (the highest fill for any given color) on smooth or rough recording sheets. To measure dropout, a chase recording sheet with a very smooth surface is run at relatively slow transfix velocity immediately after a print. The chase sheet is used to pick up any ink that was left on the intermediate transfer member. The chase sheet is scanned and the value of dropout is recorded in "PPI" or pixels per inch. The gouge measurement is used to characterize the fuse grade or the durability of the ink on recording sheets. It quantifies how well the ink adheres to the recording sheet (a measure of ink adhesion) and how well the ink adheres to itself (a measure of the cohesive strength of the ink or the toughness). A special machine called the Variable Weight Gouge Tester is used to quantify gouge. The procedure entails dragging three "tuned" and weighted metal fingers against the image and calculating the amount of ink removed in pixels per inch. As the term implies, fold durability relates to the ability of the ink (on the recording sheet) to be folded without cracking, breaking, and/or falling off the page leaving a line of missing ink. Fold is quantified by measuring the average width of the white area left after a fold. A solid fill is used since it is a stress case. Gloss is a visual impression that is caused when a surface is evaluated. The more direct light that is reflected, the more obvious will be the impression of gloss. Gloss is measured with a meter such as the BYK Gardner micro-TRI-gloss meter. A solid primary or secondary fill is used when measuring gloss. Blocking refers to the amount and/or severity of ink transfer from one portion of the image to an unprinted part of recording sheet (the same recording sheet that carries the image or another piece of recording sheet). A common case is caused when multiple images are stacked on each other for long periods of time or at relatively high temperatures.

COMPARATIVE EXAMPLE

Jetting Robustness

All comparative inks were made and filtered at 135° C. A first comparative ink composition (Comparative Ink A) was similar to that of Ink 2 except that it contained POLYWAX 655 (PE 655, obtained from Baker Petrolite, Tulsa, Okla.). A second comparative ink composition (Comparative Ink B) was similar to that of Ink 2 except that it contained a tetraamide (obtained from the reaction of one equivalent of a C-36 dimer acid obtained from Uniqema, New Castle, Del. with two equivalents of ethylene diamine and UNICID® 700 (obtained from Baker Petrolite, Tulsa, Okla., a long chain hydrocarbon having a terminal carboxylic acid group), prepared as described in Example 1 of U.S. Pat. No. 6,174,937, the disclosure of which is totally incorporated herein by reference) instead of a branched triamide. A third comparative ink composition (Comparative Ink C) contained the following ingredients: 45.26 wt. % POLYWAX 655, (PE 655, obtained from Baker Petrolite, Tulsa, Okla.); 19.50 wt. % tetra-amide (obtained from the reaction of one equivalent of a C-36 dimer acid obtained from Uniqema, New Castle, Del. with two equivalents of ethylene diamine and UNICID® 700 (obtained from Baker Petrolite, Tulsa, Okla., a long chain hydrocarbon having a terminal carboxylic acid group), prepared as described in Example 1 of U.S. Pat. No. 6,174,937, the disclosure of which is totally incorporated herein by reference); 14.20 wt. % stearyl stearamide wax (KEMAMIDE® S-180, obtained from Crompton Corporation, Greenwich, Conn.); 11.32 wt. % urethane resin obtained from the reaction of two equivalents of ABITOL® E hydroabietyl alcohol (obtained from Hercules Inc., Wilmington, Del.) and one equivalent of isophorone diisocyanate, prepared as described in Example 1 of U.S. Pat. No. 5,782,966, the disclosure of which is totally incorporated herein by reference; 5.65 wt. % urethane resin that was the adduct of three equivalents of stearyl isocyanate and a glycerol-based alcohol, prepared as described in Example 4 of U.S. Pat. No. 6,309,453, the disclosure of which is totally incorporated herein by reference; 0.2 wt. % NAUGUARD® 445 antioxidant (obtained from Uniroyal Chemical Co., Middlebury, Conn.); 0.35 wt. % dodecyl benzene sulfuric acid (DDBSA, Bio-soft S-100, obtained from Stepan Company, Elwood, Ill.); and 3.52 wt. % cyan colorant as disclosed in Examples V through XI of U.S. Pat. No. 6,472,523, the disclosure of which is totally incorporated herein by reference. The three comparative inks and Ink 3 were then incorporated into a XEROX® PHASER® 8200 printer and jetted at various temperatures. The jetting robustness of an ink refers to the ability of an ink to achieve appropriate mass at a given voltage and/or the ability of an ink to jet without failing, for example, continuously or in a pattern, for some given period of time. The test used for ink robustness entailed 1) hand feeding the ink into test fixture printhead at some starting printhead temperature, 2) purging the head using either vacuum or pressure purge to completely fill the head and jets with ink, and 3) jetting the ink a full frequency for 15 seconds measuring the number of jets alive both at the start and at the end of the test. The results for the percentage of failed jets are shown in the table below.

|  | Ink | | | |
|---|---|---|---|---|
|  | 2 | A | B | C |
| 90° C. | 20% | 100% | 100% | 100% |
| 95° C. | 0% | 100% | 100% | 100% |
| 100° C. | 0% | 100% | 75% | 100% |
| 105° C. | 0% | 100% | 12% | 100% |
| 110° C. | 0% | 2% | 0% | 100% |
| 115° C. | 0% | 1% | 0% | 100% |
| 120° C. | 0% | 0% | 0% | 45% |
| 125° C. | 0% | 0% | 0% | 9% |
| 130° C. | 0% | 0% | 0% | 0% |

As the data indicate, the comparative inks performed poorly at jetting temperatures at or below 110° C., causing high numbers of failed jets. In contrast, Ink 2 performs well at temperatures below 110° C.

EXAMPLE II

Ink Stick Sweating

Two additional comparative ink compositions (Ink D and Ink E) were prepared by the process described in Example I. These inks were used for comparison purposes with respects to inks 1 and 7. The inks contained the following ingredients in the following amounts:

|  | Ink | | | | |
|---|---|---|---|---|---|
|  | 1 | 6 | 7 | D | E |
| PE 500 | 0 | 0 | 0 | 50.00 | 51.87 |
| distilled wax | 52.91 | 53.9 | 58.03 | 0 | 0 |
| triamide | 15.32 | 12.72 | 10.49 | 13.95 | 13.06 |
| S-180 | 15.14 | 15.4 | 12.87 | 15.14 | 14.84 |
| KE-100 | 7.96 | 11.3 | 9.3 | 12.42 | 11.23 |
| urethane | 4.42 | 4.5 | 3.76 | 4.42 | 4.34 |
| DDBSA | 0.27 | 0 | 0 | 0.35 | 0 |
| N-445 | 0.17 | 0.18 | 0.14 | 0.17 | 0.17 |
| cyan colorant | 3.81 | 0 | 0 | 3.55 | 0 |
| yellow colorant | 0 | 2 | 0 | 0 | 0 |
| magenta #1 | 0 | 0 | 3.04 | 0 | 2.32 |
| magenta #2 | 0 | 0 | 1.65 | 0 | 1.87 |
| ZnCl$_2$ | 0 | 0 | 0.7 | 0 | 0.30 |

The ink sticks were evaluated for sweating, which is a problem wherein some ink ingredients migrate to the surface of solid ink sticks and aggregate at the ink stick surface inside the printer; the sticky "sweat" gradually drains down to the bottom and can cause the ink sticks to adhere to the ink load racks in the printers. Sticks were formed of the inks and sweating was evaluated visually by placing the sticks in pans in an oven at various temperatures. The results are summarized in the table below. 0=no sweating; 1=a little sweating; 2=some sweating; 3=significant sweating.

|  | Aging time | | | | |
|---|---|---|---|---|---|
|  | 18 hrs | 43 hrs | 18 hrs | 18 hrs | 43 hrs |
|  |  |  | Temp. |  |  |
| Ink | 50° C. | 50° C. | 60° C. | 69° C. | 69° C. |
| 1 | 0 | 0 | 0 | 0 | 0 |
| 6 | 0 | 0 | 0 | 0 | 0 |
| 7 | 0 | 0 | 0 | 0 | 0 |
| D | 0 | 0 | 0 | 1 | 1 |
| E | 0 | 0 | 0 | 1 | 1 |

As the results indicate, the inks prepared containing the wax having the lowest ten percent molecular weight fraction removed exhibited improved behavior compared to the ink containing the commercial polyethylene wax.

EXAMPLE III

Ink Print Showthrough

With prints on paper with inks containing polyethylene wax, ink showthrough sometimes occurs with these prints under high temperature conditions, wherein the ink diffuses through the paper to show color on the back side of the paper. In a lab experiment designed to study this phenomenon, Inks 1, 6, and 7 as well as Comparative Inks F, G, H, and J were incorporated into a K-Printing Proofer (manufactured by RK Print Coat Instruments, Royston, UK) and prints were generated at 135° C. on HAMMERMILL paper.

|  | Ink | | | | | | |
|---|---|---|---|---|---|---|---|
|  | F | G | H | J | 1 | 6 | 7 |
| PE 500 | 49.46 | 50.20 | 50.72 | 51.74 | 0 | 0 | 0 |
| distilled wax | 0 | 0 | 0 | 0 | 52.91 | 53.9 | 58.03 |
| triamide | 17.31 | 13.90 | 14.15 | 13.10 | 15.32 | 12.72 | 10.49 |
| S-180 | 14.44 | 15.14 | 15.36 | 14.80 | 15.14 | 15.4 | 12.87 |
| KE-100 | 9.00 | 12.30 | 12.61 | 11.30 | 7.96 | 11.3 | 9.3 |
| urethane wax | 5.00 | 4.42 | 4.48 | 4.34 | 4.42 | 4.5 | 3.76 |
| DDBSA | 0.30 | 0.32 | 0.50 | 0 | 0.27 | 0 | 0 |
| N-445 | 0.19 | 0.17 | 0.18 | 0.17 | 0.17 | 0.18 | 0.14 |
| cyan colorant | 4.30 | 3.55 | 0 | 0 | 3.81 | 0 | 0 |
| yellow colorant | 0 | 0 | 2.00 | 0 | 0 | 2 | 0 |
| magenta #1 | 0 | 0 | 0 | 2.35 | 0 | 0 | 3.04 |
| magenta #2 | 0 | 0 | 0 | 0.30 | 0 | 0 | 1.65 |
| ZnCl$_2$ | 0 | 0 | 0 | 1.90 | 0 | 0 | 0.7 |

Inks F, G, H, and J are provided for comparative purposes.

Color space data were obtained for the back sides of the paper on an ACS® Spectro Sensor® 11 Colorimeter (obtained from Applied Color Systems Inc.) in accordance with the measuring methods stipulated in ASTM 1E805 (Standard Practice of Instrumental Methods of Color or Color Difference Measurements of Materials) using the appropriate calibration standards supplied by the instrument manufacturer. For purposes of verifying and quantifying the overall calorimetric performance of the inks, measurement data were reduced, via tristimulus integration, following ASTM E308 (Standard Method for Computing the Colors of Objects using the CIE System) in order to calculate the 1976 CIE L* (Lightness), a* (redness-greenness), and b* (yellowness-blueness) CIELAB values for each phase change ink sample. Thereafter, the prints were separated with blank pieces of paper and placed inside ovens at 50° C. and 69° C. No noticeable backside showthrough was observed over time at 50° C. At 69° C., however, significant showthrough was observed for Inks F through J. The showthrough extents were expressed in backside color changes (in terms of Delta E) from the original colors before cooking (Time Zero) as a function of time at 69° C.; delta E vs. time is indicated in the table below:

| Ink | 18 hrs 50° C. | 43 hrs 50° C. | 113 hrs 50° C. | 18 hrs 69° C. | 43 hrs 69° C. | 113 hrs 69° C. |
|---|---|---|---|---|---|---|
| F | 0.3 | 0.4 | 0.3 | 2.5 | 4.0 | 6.6 |
| G | 0.3 | 0.4 | 0.4 | 2.2 | 4.5 | 6.5 |
| H | 1.3 | 1.4 | 1.3 | 5.9 | 9.4 | 11.5 |
| J | 0.5 | 0.6 | 0.6 | 5.0 | 8.0 | 11.6 |
| 1 | 0.2 | 0.3 | 0.5 | 0.7 | 1.1 | 1.6 |
| 6 | 1.3 | 1.4 | 1.4 | 3.9 | 5.9 | 9.0 |
| 7 | 0.6 | 0.6 | 0.6 | 2.0 | 4.3 | 8.2 |

As the results indicate, Inks F, G, H, and J, all containing the commercial polyethylene wax, exhibited very similar degrees of showthrough even though their formulations and dye concentrations are different, which suggests that showthrough is predominantly affected by the wax. In contrast, Ink 1, containing the polyethylene wax having the lowest ten percent molecular weight fraction removed exhibited substantially reduced showthrough compared to the inks containing the commercial polyethylene wax.

Other embodiments and modifications of the present invention may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. A phase change ink comprising (a) a colorant and (b) a phase change ink carrier, said carrier comprising (i) a branched triamide and (ii) a polyethylene wax having an average peak molecular weight of from about 350 to about 730, a polydispersity of from about 1.03 to about 3.0, and an asymmetrical molecular weight distribution skewed toward the high molecular weight end.

2. An ink according to claim 1 wherein the polyethylene wax, when tested by high temperature gel permeation chromatography, generate a curve for relative amount as expressed by the signal intensity detected by refractive index detector versus retention time (in seconds) having a negative skew with an absolute value of at least about 0.05.

3. An ink according to claim 1 wherein the polyethylene wax, when tested by high temperature gel permeation chromatography, generate a curve for relative amount as expressed by the signal intensity detected by refractive index detector versus retention time (in seconds), having a negative skew with an absolute value of at least about 0.075.

4. An ink according to claim 1 wherein the polyethylene wax, when tested by high temperature gel permeation chromatography, generate a curve for relative amount as expressed by the signal intensity detected by refractive index detector versus retention time (in seconds) having a negative skew with an absolute value of at least about 0.1.

5. An ink according to claim 1 wherein the polyethylene wax, when tested by high temperature gel permeation chromatography, generate a curve for relative amount as expressed by the signal intensity detected by refractive index detector versus retention time (in seconds) having a negative skew with an absolute value of no more than about 0.8.

6. An ink according to claim 1 wherein the polyethylene wax, when tested by high temperature gel permeation chromatography, generate a curve for relative amount as expressed by the signal intensity detected by refractive index detector versus retention time (in seconds) having a negative skew with an absolute value of no more than about 0.7.

7. An ink according to claim 1 wherein the polyethylene wax, when tested by high temperature gel permeation chromatography, generate a curve for relative amount as expressed by the signal intensity detected by refractive index detector versus retention time (in seconds) having a negative skew with an absolute value of no more than about 0.6.

8. An ink according to claim 1 wherein the polyethylene wax has an average peak molecular weight of at least about 400.

9. An ink according to claim 1 wherein the polyethylene wax has an average peak molecular weight of at least about 470.

10. An ink according to claim 1 wherein the polyethylene wax has an average peak molecular weight of no more than about 700.

11. An ink according to claim 1 wherein the polyethylene wax has an average peak molecular weight of no more than about 600.

12. An ink according to claim 1 wherein the polyethylene wax has an average peak molecular weight of from about 400 to about 700.

13. An ink according to claim 1 wherein the polyethylene wax has an average peak molecular weight of from about 470 to about 600.

14. An ink according to claim 1 wherein the polyethylene wax has a polydispersity of no more than about 2.5.

15. An ink according to claim 1 wherein the polyethylene wax has a polydispersity of no more than about 2.0.

16. An ink according to claim 1 wherein the polyethylene wax has a polydispersity of no more than about 1.8.

17. An ink according to claim 1 wherein the polyethylene wax has a peak melting point of at least about 50° C.

18. An ink according to claim 1 wherein the polyethylene wax has a peak melting point of at least about 70° C.

19. An ink according to claim 1 wherein the polyethylene wax has a peak melting point of no more than about 130° C.

20. An ink according to claim 1 wherein the polyethylene wax has a peak melting point of no more than about 120° C.

21. An ink according to claim 1 wherein the polyethylene wax has an onset melting point of at least about 45° C.

22. An ink according to claim 1 wherein the polyethylene wax has an onset melting point of at least about 55° C.

23. An ink according to claim 1 wherein the polyethylene wax has an onset melting point of no more than about 70° C.

24. An ink according to claim 1 wherein the polyethylene wax has a viscosity at about 110° C. of at least about 3 centipoise.

25. An ink according to claim 1 wherein the polyethylene wax has a viscosity at about 110° C. of no more than about 10 centipoise.

26. An ink according to claim 1 wherein the polyethylene wax is present in the ink in an amount of at least about 10 percent by weight of the ink carrier.

27. An ink according to claim 1 wherein the polyethylene wax is present in the ink in an amount of at least about 20 percent by weight of the ink carrier.

28. An ink according to claim 1 wherein the polyethylene wax is present in the ink in an amount of no more than about 95 percent by weight of the carrier.

29. An ink according to claim 1 wherein the branched triamide is of the formula

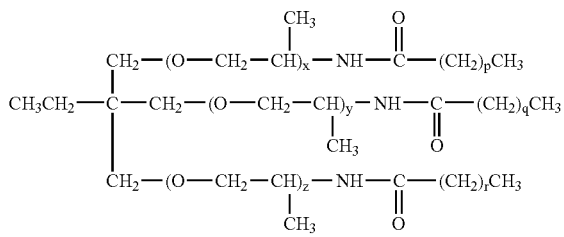

wherein x, y, and z each independently represent the number of propyleneoxy repeat units and x+y+z is from about 5 to about 6, and wherein p, q, and r each, independently of the others, are integers representing the number of repeat —(CH$_2$)— units.

30. An ink according to claim 29 wherein p, q, and r have an average peak value of from about 15 to about 60.

31. An ink according to claim 29 wherein p, q, and r have an average peak value of from about 26 to about 45.

32. An ink according to claim 1 wherein the triamide is present in the ink in an amount of at least about 2 percent by weight of the ink carrier.

33. An ink according to claim 1 wherein the triamide is present in the ink in an amount of no more than about 50 percent by weight of the ink carrier.

34. An ink according to claim 1 wherein the colorant is present in the ink in an amount of at least about 0.1 percent by weight of the ink.

35. An ink according to claim 1 wherein the colorant is present in the ink in an amount of no more than about 20 percent by weight of the ink.

36. An ink according to claim 1 further containing a monoamide.

37. An ink according to claim 36 wherein the monoamide is stearyl stearamide.

38. An ink according to claim 36 wherein the monoamide is present in the ink in an amount of at least about 2 percent by weight of the ink.

39. An ink according to claim 36 wherein the monoamide is present in the ink in an amount of no more than about 90 percent by weight of the ink.

40. An ink according to claim 1 further containing an isocyanate-derived material.

41. An ink according to claim 40 wherein the isocyanate-derived material is a urethane resin obtained from the reaction of two equivalents of hydroabietyl alcohol and one equivalent of isophorone diisocyanate.

42. An ink according to claim 41 wherein the urethane resin is present in the ink in an amount of at least about 2 percent by weight of the ink carrier.

43. An ink according to claim 40 wherein the isocyanate-derived material is a urethane resin that is the adduct of three equivalents of stearyl isocyanate and a glycerol-based alcohol.

44. An ink according to claim 43 wherein the urethane resin is present in the ink in an amount of at least about 1 percent by weight of the ink carrier.

45. An ink according to claim 1 further containing a triglyceride of hydrogenated abietic acid.

46. An ink according to claim 1 wherein the ink has a peak melting point of at least about 50° C.

47. An ink according to claim 1 wherein the ink has a peak melting point of at least about 70° C.

48. An ink according to claim 1 wherein the ink has a peak melting point of no more than about 140° C.

49. An ink according to claim 1 wherein the ink has a peak melting point of no more than about 100° C.

50. An ink according to claim 1 wherein the ink has a viscosity at the jetting temperature of no more than about 20 centipoise.

51. An ink according to claim 1 wherein the ink has a viscosity at the jetting temperature of no more than about 15 centipoise.

52. An ink according to claim 1 wherein the ink has a viscosity of from about 7 to about 15 centipoise at about 110° C.

53. An ink according to claim 1 wherein the ink has a viscosity of from about 7 to about 15 centipoise at about 115° C.

54. An ink according to claim 1 wherein the ink has a viscosity of from about 7 to about 15 centipoise at about 120° C.

55. An ink according to claim 54 wherein the jetting temperature is no more than about 120° C.

56. An ink according to claim 1 wherein the colorant is of the formula

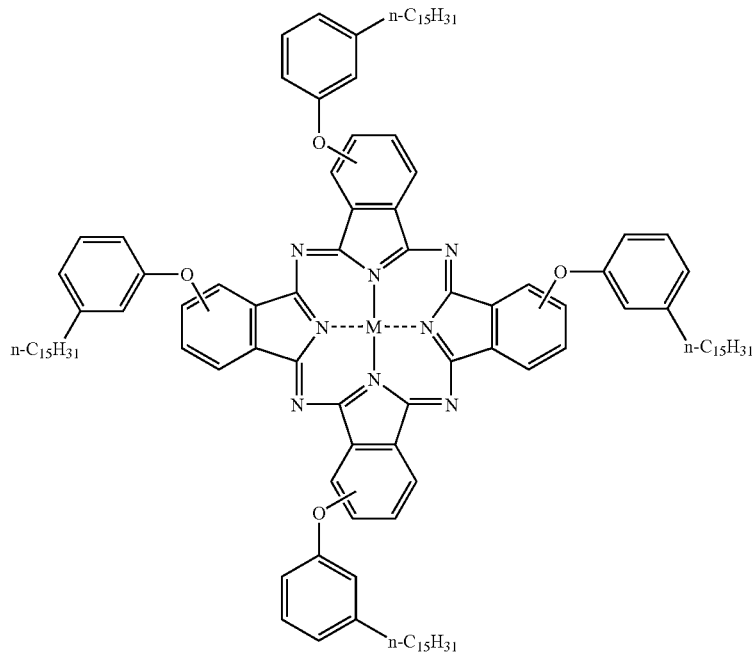

wherein M is an atom or group of atoms capable of bonding to the central cavity of a phthalocyanine molecule, wherein axial ligands optionally can be attached to M.

57. An ink according to claim 1 wherein the colorant is of the formula

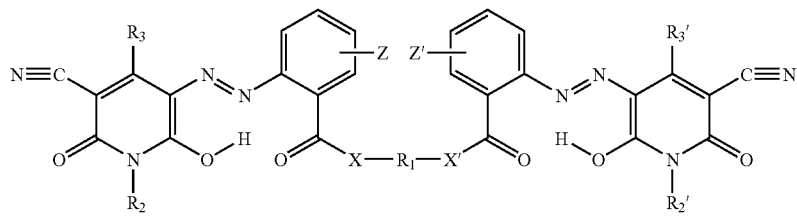

wherein (A) $R_1$ is (i) an alkylene group, (ii) an arylene group, (iii) an arylalkylene group, (iv) an alkylarylene group, (v) an alkyleneoxy group, (vi) an aryleneoxy group, (vii) an arylalkyleneoxy group, (viii) an alkylaryleneoxy group, (ix) a polyalkyleneoxy group, (x) a polyaryleneoxy group, (xi) a polyarylalkyleneoxy group, (xii) a polyalkylaryleneoxy group, (xiii) a heterocyclic group, (xiv) a silylene group, (xv) a siloxane group, (xvi) a polysilylene group, or (xvii) a polysiloxane group, (B) $R_2$ and $R_2'$ each, independently of the other, is (i) an alkyl group, (ii) an aryl group, (iii) an arylalkyl group, (iv) an alkylaryl group, (v) an alkoxy group, (vi) an aryloxy group, (vii) an arylalkyloxy group, (viii) an alkylaryloxy group, (ix) a polyalkyleneoxy group, (x) a polyaryleneoxy group, (xi) a polyarylalkyleneoxy group, (xii) a polyalkylaryleneoxy group, (xiii) a heterocyclic group, (xiv) a silyl group, (xv) a siloxane group, (xvi) a polysilylene group, (xvii) a polysiloxane group, or (xviii) a group of the formula

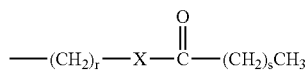

wherein r and s are each, independently of the other, integers representing a number of repeat —$CH_2$— groups, (C) $R_3$ and $R_3'$ each, independently of the other, is (i) an alkyl group, (ii) an aryl group, (iii) an arylalkyl group, or (iv) an alkylaryl group, (D) X and X' each, independently of the other, is (i) a direct bond, (ii) an oxygen atom, (iii) a sulfur atom, (iv) a group of the formula —$NR_{40}$— wherein $R_{40}$ is a hydrogen atom, an alkyl group, an aryl group, an arylalkyl group, or an alkylaryl group, or (v) a group of the formula —$CR_{50}R_{60}$— wherein $R_{50}$ and $R_{60}$ each, independently of the other, is a hydrogen atom, an alkyl group, an aryl group, an arylalkyl group, or an alkylaryl group, and (E) Z and Z' each, independently of the other, is (i) a hydrogen atom, (ii) a halogen atom, (iii) d nitro group, (iv) an alkyl group, (v) an aryl group, (vi) an arylalkyl group, (vii) an alkylaryl group, (viii) a group of the formula

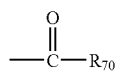

wherein $R_{70}$ is an alkyl group, an aryl group, an arylalkyl group, an alkylaryl group, an alkoxy group, an aryloxy group, an arylalkyloxy group, an alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group, (ix) a sulfonyl group of the formula —$SO_2R_{80}$ wherein $R_{80}$ is a hydrogen atom, an alkyl group, an aryl group, an arylalkyl group, an alkylaryl group, an alkoxy group, an aryloxy group, an arylalkyloxy group, an alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group, or (x) a phosphoryl group of the formula —$PO_3R_{90}$ wherein $R_{90}$ is a hydrogen atom, an alkyl group, an aryl group, an arylalkyl group, an alkylaryl group, an alkoxy group, an aryloxy group, an arylalkyloxy group, an alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group.

58. An ink according to claim 57 wherein the jetting temperature is no more than about 120° C.

59. An ink according to claim 1 wherein the colorant is of the formula

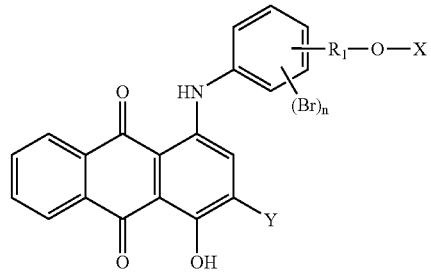

wherein Y is a hydrogen atom or a bromine atom, n is an integer of 0, 1, 2, 3, or 4, $R_1$ is an alkylene group or an arylalkylene group, and X is (a) a hydrogen atom, (b) a group of the formula

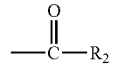

wherein $R_2$ is an alkyl group, an aryl group, an arylalkyl group, or an alkylaryl group, (c) an alkyleneoxy, aryleneoxy, arylalkyleneoxy, or alkylaryleneoxy group, or (d) a group of the formula

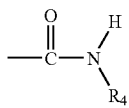

wherein $R_4$ is an alkyl group, an aryl group, an arylalkyl group, or an alkylaryl group.

60. An ink according to claim 1 wherein the colorant is of the formula

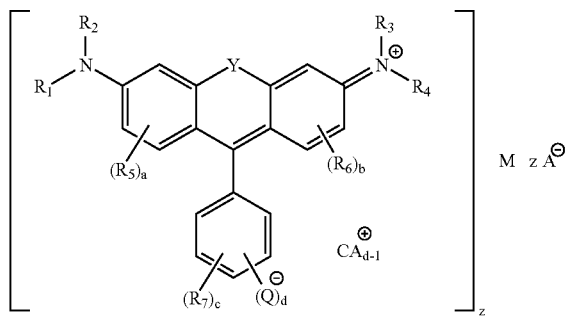

wherein M is either (1) a metal ion having a positive charge of +y wherein y is an integer which is at least 2, said metal ion being capable of forming a compound with at least two

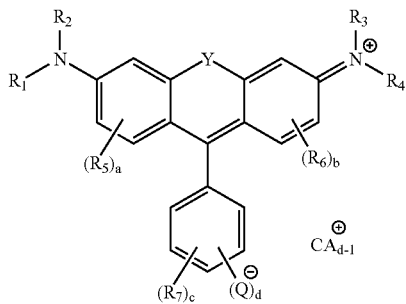

chromogen moieties, or (2) a metal-containing moiety capable of forming a compound with at least two

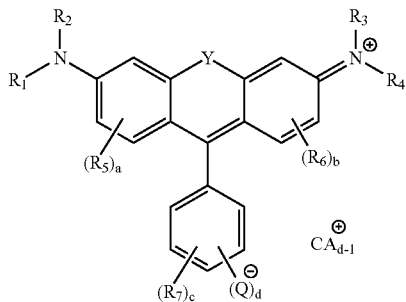

chromogen moieties, z is an integer representing the number of

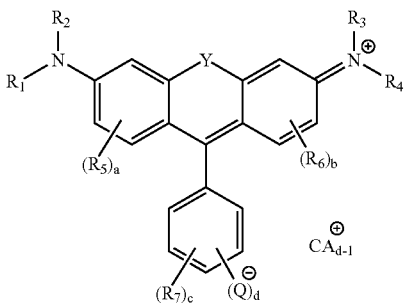

chromogen moieties associated with the metal and is at least 2, $R_1$, $R_2$, $R_3$, and $R_4$ each, independently of the others, is (i) a hydrogen atom, (ii) an alkyl group, (iii) an aryl group, (iv) an arylalkyl group, or (v) an alkylaryl group, wherein $R_1$ and $R_2$ can be joined together to form a ring, wherein $R_3$ and $R_4$ can be joined together to form a ring, and wherein $R_1$, $R_2$, $R_3$, and $R_4$ can each be joined to a phenyl ring in the central structure, a and b each, independently of the others, is an integer which is 0, 1, 2, or 3, c is an integer which is 0, 1, 2, 3, or 4, each $R_5$, $R_6$, and $R_7$, independently of the others, is (i) an alkyl group, (ii) an aryl group, (iii) an arylalkyl group, (iv) an alkylaryl group, (v) a halogen atom, (vi) an ester group, (vii) an amide group, (viii) a sulfone group, (ix) an amine group or ammonium group, (x) a nitrile group, (xi) a nitro group, (xii) a hydroxy group, (xiii) a cyano group, (xiv) a pyridine or pyridinium group, (xv) an ether group, (xvi) an aldehyde group, (xvii) a ketone group, (xviii) a carbonyl group, (xix) a thiocarbonyl group, (xx) a sulfate group, (xxi) a sulfide group, (xxii) a sulfoxide group, (xxiii) a phosphine or phosphonium group, (xxiv) a phosphate group, (xxv) a mercapto group, (xxvi) a nitroso group, (xxvii) an acyl group, (xxviii) an acid anhydride group, (xxix) an azide group, (xxx) an azo group, (xxxi) a cyanato group, (xxxii) an isocyanato group, (xxxiii) a thiocyanato group, (xxxiv) an isothiocyanato group, (xxxv) a urethane group, or (xxxvi) a urea group, wherein $R_5$, $R_6$, and $R_7$ can each be joined to a phenyl ring in the central structure,

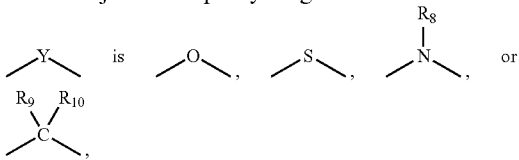

$R_8$, $R_9$, and $R_{10}$ each, independently of the others, is (i) a hydrogen atom, (ii) an alkyl group, (iii) an aryl group, (iv) an arylalkyl group, or (v) an alkylaryl group, provided that the number of carbon atoms in $R_1+R_2+R_3+R_4+R_5+R_6+R_7+R_8+R_9+R_{10}$ is at least about 16, $Q^-$ is a $COO^-$ group or a $SO_3^-$ group, d is an integer which is 1, 2, 3, 4, or 5, A is an anion, and CA is either a hydrogen atom or a cation associated with all but one of the $Q^-$ groups.

61. An ink according to claim 60 further containing a colorant of the formula

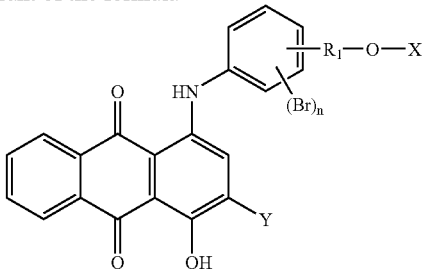

wherein Y is a hydrogen atom or a bromine atom, n is an integer of 0, 1, 2, 3, or 4, $R_1$ is an alkylene group or an arylalkylene group, and X is (a) a hydrogen atom, (b) a group of the formula

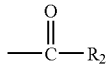

wherein $R_2$ is an alkyl group, an aryl group, an arylalkyl group, or an alkylaryl group, (c) an alkyleneoxy, aryleneoxy, arylalkyleneoxy, or alkylaryleneoxy group, or (d) a group of the formula

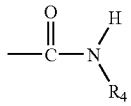

wherein $R_4$ is an alkyl group, an aryl group, an arylalkyl group, or an alkylaryl group.

62. An ink according to claim 1 wherein the polyethylene wax has a freezing point of at least about 40° C.

63. An ink according to claim 1 wherein the polyethylene wax has a freezing point of at least about 55° C.

64. An ink according to claim 1 wherein the polyethylene wax has a freezing point of no more than about 83° C.

65. A process which comprises (1) incorporating into an ink jet printing apparatus a phase change ink comprising (a) a colorant and (b) a phase change ink carrier, said carrier comprising (i) a branched triamide and (ii) a polyethylene wax having an average peak molecular weight of from about 350 to about 730, a polydispersity of from about 1.03 to about 3.0, and an asymmetrical molecular weight distribution skewed toward the high molecular weight end; (2) melting the ink; and (3) causing droplets of the melted ink to be ejected in an imagewise pattern onto a substrate.

66. A process according to claim 65 wherein the printing apparatus employs a piezoelectric printing process wherein droplets of the ink are caused to be ejected in imagewise pattern by oscillations of piezoelectric vibrating elements.

67. A process according to claim 65 wherein the substrate is a final recording sheet and droplets of the melted ink are ejected in an imagewise pattern directly onto the final recording sheet.

68. A process according to claim 65 wherein the substrate is an intermediate transfer member and droplets of the melted ink are ejected in an imagewise pattern onto the intermediate transfer member followed by transfer of the imagewise pattern from the intermediate transfer member to a final recording sheet.

69. A process according to claim 68 wherein the intermediate transfer member is heated to a temperature above that of the final recording sheet and below that of the melted ink in the printing apparatus.

70. A process according to claim 68 wherein both the intermediate transfer member and the final recording sheet are heated to a temperature below that of the melted ink in the printing apparatus, and wherein the final recording sheet is heated to a temperature above that of the intermediate transfer member and below that of the melted ink in the printing apparatus.

71. A process according to claim 68 wherein both the intermediate transfer member and the final recording sheet are heated to a temperature below that of the melted ink in the printing apparatus, and wherein the intermediate transfer member is heated to a temperature above that of the final recording sheet and below that of the melted ink in the printing apparatus.

* * * * *